US011221680B1

(12) United States Patent
Clements

(10) Patent No.: US 11,221,680 B1
(45) Date of Patent: Jan. 11, 2022

(54) HAND GESTURES USED TO OPERATE A CONTROL PANEL FOR A DEVICE

(71) Applicant: Sigmund Lindsay Clements, Montreal (CA)

(72) Inventor: Sigmund Lindsay Clements, Montreal (CA)

(*) Notice: Subject to any disclaimer, the term of this patent is extended or adjusted under 35 U.S.C. 154(b) by 0 days.

(21) Appl. No.: 16/246,503

(22) Filed: Jan. 13, 2019

Related U.S. Application Data

(63) Continuation-in-part of application No. 14/258,013, filed on Apr. 22, 2014, now Pat. No. 9,477,317, which is a continuation-in-part of application No. 15/851,569, filed on Dec. 21, 2017, now abandoned, which is a continuation-in-part of application No. 14/634,788, filed on Feb. 28, 2015, now Pat. No. 10,691,397.

(60) Provisional application No. 61/946,789, filed on Mar. 1, 2014, provisional application No. 62/617,327, filed on Jan. 15, 2018.

(51) Int. Cl.
*G06F 3/01* (2006.01)
*G06F 3/0482* (2013.01)
*G06F 3/0481* (2013.01)

(52) U.S. Cl.
CPC ............ *G06F 3/017* (2013.01); *G06F 3/0482* (2013.01); *G06F 3/04817* (2013.01); *G06F 3/013* (2013.01)

(58) Field of Classification Search
CPC ..... G06F 3/017; G06F 3/0482; G06F 3/04817
See application file for complete search history.

(56) References Cited

U.S. PATENT DOCUMENTS

| 5,594,469 | A | * | 1/1997 | Freeman | G06F 3/017 345/158 |
|---|---|---|---|---|---|
| 6,498,628 | B2 | * | 12/2002 | Iwamura | G08C 23/00 345/157 |
| 7,665,041 | B2 | * | 2/2010 | Wilson | G06F 3/017 715/860 |
| 9,459,697 | B2 | * | 10/2016 | Bedikian | G06F 3/017 |
| 9,916,009 | B2 | * | 3/2018 | Zagorsek | G06F 3/017 |
| 9,971,491 | B2 | * | 5/2018 | Schwesinger | G06F 3/017 |
| 2009/0217211 | A1 | * | 8/2009 | Hildreth | G06F 3/0304 715/863 |
| 2011/0296353 | A1 | * | 12/2011 | Ahmed | G06F 3/04815 715/848 |
| 2012/0320080 | A1 | * | 12/2012 | Giese | G06F 3/017 345/619 |

(Continued)

*Primary Examiner* — Michael C Zarroli

(57) ABSTRACT

A hand gesture sensor, a device, and a display, are connected a computer. Hand gestures in midair, are detected by the hand gesture sensor, and are used to operate the device. Operations of the device that are activatable by hand gesture, are shown on the display, as input icons. The input icons are activated by a displayed cursor following, a detected hand in midair, to an icon to be activated. With the cursor touching the icon, a hand gesture, such as, a thumb touching an index finger in midair, activates the icon. Operating the device with hand gestures, allows for operation of the device, without touch inputting the device's physical input surfaces. Multi user public devices, like, elevators, may have bacteria from users, on their touch input surfaces. Avoiding touching physical input surfaces of devices, allows the user to avoid touching harmful bacteria, which may be on the surfaces.

14 Claims, 4 Drawing Sheets

(56) References Cited

U.S. PATENT DOCUMENTS

| | | | | |
|---|---|---|---|---|
| 2013/0044053 A1* | 2/2013 | Galor | ............... | G06F 3/017 |
| | | | | 345/158 |
| 2013/0285904 A1* | 10/2013 | Kaplan | ............... | G06F 3/017 |
| | | | | 345/157 |
| 2013/0321265 A1* | 12/2013 | Bychkov | ............... | G06F 3/011 |
| | | | | 345/156 |
| 2013/0343607 A1* | 12/2013 | Wilf | ............... | G06F 3/012 |
| | | | | 382/103 |
| 2014/0055385 A1* | 2/2014 | Duheille | ............... | G06F 1/1684 |
| | | | | 345/173 |
| 2014/0240215 A1* | 8/2014 | Tremblay | ............... | G06T 11/001 |
| | | | | 345/156 |
| 2014/0369558 A1* | 12/2014 | Holz | ............... | G06K 9/2036 |
| | | | | 382/103 |
| 2015/0234467 A1* | 8/2015 | Tachibana | ............... | G06F 3/017 |
| | | | | 715/863 |
| 2015/0363070 A1* | 12/2015 | Katz | ............... | G06F 3/013 |
| | | | | 715/852 |

\* cited by examiner

HAND GESTURES USED TO OPERATE A CONTROL PANEL FOR A DEVICE

CROSS REFERENCE TO RELATED APPLICATIONS

This application claims the benefit of provisional patent applications Ser. No. 62/617,327, filed 2018 Jan. 15. This present application is a continuation application of application number Ser. No. 15/851,569 filed 2017 Dec. 21, which is a continuation in part of application Ser. No. 14/634,788, filled 2015 Feb. 28, which is a continuation in part of application Ser. No. 14/258,013 filed 2014 Apr. 22, publication U.S. Pat. No. 9,477,317 B1 and the benefit of provisional patent applications Ser. No. 61/946,789, filed 2014 Mar. 1, and naming Sigmund Clements as inventor. All the foregoing applications are hereby incorporated herein by reference in their entirety.

FEDERALLY SPONSORED RESEARCH

Not Applicable

SEQUENCE LISTING

Not Applicable

TECHNICAL FIELD OF THE EMBODIMENTS

A hand tracker, and display, are used for a user, to use hand gesture, to input, and operate a computer.

BACKGROUND OF THE EMBODIMENTS

Avoiding Bacteria on Touch Input Buttons

Many people don't like to touch input buttons, that may have harmful bacteria on them, such as, public input control panels for devices. Control panel input buttons, which are touched by multiple users, have the problem of accumulating bacteria, or viruses on their surfaces. The bacteria are transferred from the user's fingers to the buttons. The bacteria on the buttons, may be transferred to the user's fingers, when they touch the buttons.

Fast food self-serve order kiosks, self-serve displayed food menu, use touch by users on a touch screen display to order food. The display may accumulate bacteria. It may be a bad time to touch bacteria on the display, due to the users handling food, and eating the handled, after touching the display.

Avoiding finger contact with a touch input button, reduces the contact, and transmission, of possibly harmful pathogens on the button. Reducing or eliminating bacterial transmission, from the buttons to the user, reduces the possibility of the user becoming ill, from bacteria transmitted to the user.

Avoiding Bacteria by Using a Smart Phone

A smart phone can be used to operate devices such as, a smart toilet, or vending machine. The phone frees a user, from needing to touch input buttons, used by multiple users. A drawback is the user needs to carry the phone, hold the phone, and if the battery is low it may not function.

Augmented Reality Glasses Used to Operate a Device

Smart glasses use visual information, displayed on the glass's lenses, and viewable by the user. The glasses can use voice recognition, or eye gaze to operate a video camera that's part of the glasses. The voice recognition allows the user to operate the camera, without needing to touch input buttons. The glasses aren't used to operate devices remotely. The glasses need to be worn by the user.

A Proximity Sensor Used to Detect a User's Hand in Mid-Air

Infrared hand sensors are used to operate devices in bathrooms, without touching a surface, such as, water faucets of sinks, toilet flushers, and hand dryers. In Hospitals motion sensing is used to open doors, without a user needing to touch a surface. The sensors have limited input commands, such as, on or off, which restricts the number of different inputs that can be used.

Midair Holographic Input Buttons Used to Operate Devices

Midair holographic input buttons, can be touched in mid-air, and used as input buttons for a device. The buttons can be made by devices, that project on to mid-air water droplets, optical illusion devices, and lasers beam projecting plasma in mid-air. A camera detects when the user touches the button, with their finger. Since there aren't bacteria in mid-air, the finger avoids contacting bacteria when touching the buttons. The display may need a water supply, Ineffective Ways to Avoid Bacteria Some people try to wrap paper around their hand, before touching control panel buttons, to try to put an antibacterial barrier between their hand and the buttons. The paper barrier is ineffective, since bacteria can easily travel through paper.

People may try to use a piece of clothing, such as, a part of a shirt sleeve as a barrier between the buttons, and the hand. The shirt sleeve may act as a barrier; thought bacteria can attach to the shirt sleeve.

Disposable rubber gloves may be effective, in sanitarily using the physical buttons, though it may be inconvenient to carry, and use gloves. Antibacterial swipes can be used to eliminate bacteria on buttons, though the discarded wipes produce waste.

Disadvantages

Many of the devices used to avoid touching input buttons, used to operate a device, heretofore known suffer from several disadvantages:

a) Bacteria and viruses can be transmitted to users, who touch control panel buttons on multiuser touch screens.

b) A user may inadvertently touch a device, having bacteria on it, while mid-air inputting near the device. It may be the difficult to judge a finger's distance, from an input device while mid-air touch inputting, which may lead to the finger inadvertently touching the device.

c) A static electric discharge may be created as a user touches, an input screen, or input button, which maybe be hazardous in flammable environments.

d) Augmented reality headsets aren't configured to operate, many devices wirelessly, at a distance. The headset needs to be worn by the user.

An improved input device, such as, a hand tracker, which allows a user to operate a device, with hand gesture, touch freely, is needed.

SUMMARY

Cursor Following Finger

A is cursor is displayed with input icons on a display. The cursor follows one of the user's fingers as they move in midair. The finger moves the cursor to contact an icon that the user wants to activate. A putting of thumb and index finger together is a gesture that is used to left click, and activate, the icon, contacted by the cursor. A finger radar in the display detects the finger gesture in front of the display.

The cursor is perpendicular on the display, or at angle to the finger position in midair. The camera is part of the display. The camera is positioned to view the user's fingers when they're in front of the display. The display is connected to the computer. The camera is connected to a computer. The computer has hand gesture recognition software. The computer is connected to a device to be operated. The display is connected to the computer. The devices control panel is displayed on the display, such as, a smart toilet control panel is shown on the display.

The user gestures, in mid-air at a graphic interface, input icons, on the display. The graphic interface displays the device's input functions, with input icons. The gesture is directed at an icon, that is desired to be activated, such as, an on or off button.

Activating the on button, activates an on function of a device. Devices may include a self-driving car, or an elevator. The computer has a software that operates the hand tracker and can operate, the device.

Touch input devices, that are used by many users, may accumulate harmful bacteria, from users touching the physical input buttons. The bacteria may spread, to the users touching the buttons. Examples of multi-user devices include, a smart toilet, an elevator, and automatic teller machine.

Users avoid contact with bacteria, while operating a device, by using hand gestures in midair, to input into the device. The input operates the device.

Advantages of Operating a Device with Touch Free Hand Gesture

The user can operate a public multiuser machine, without contacting bacteria which may be on touch input buttons.

Advantages

There are benefits to a user by using, a hand tracking display, with a user interface, to operate a device.

a) A user can avoid, contact with bacteria, and viruses on physical input buttons, by replacing the input buttons with, bacteria free, gesture input buttons.

b) The hand tracking display can be configured to operate many devices; different devices operating control panels can be displayed.

c) The user may enjoy the visually attractive input icons, visual colors, shapes, movement, and images of the input buttons. The input buttons visual colors, and shapes can be changed by the user.

d) A hand tracking operation of devices, can be used in bacterial environments. This may reduce the spread of anti-biotic resistant super bacteria, when used to operate hospital devices, such as, hospital elevators, or restaurant user self-serve kiosks that's users use, to order menu food items from.

e) A hand tracking display operation may be used in flammable environments to avoid static electric discharges, which may ignite flammable material.

f) Hand tracking may reduce dust produced by typing on keyboards, which may be useful in dust free environments, such as, in semiconductor production areas.

g) Users may be less stressed knowing, using hand gestures in midair to order food at food order displays, that they're not touching other people's bacteria on physical restaurant display order kiosk's.

There is a desire, to provide an improved hand tracking display, having a user interface. The improvement to the hand tracking display, is the connection of the display, to operate different devices. The improvement allows a user to operate different devices, with the hand tracking display advantageously. The hand tracking display is improved, by the addition, of the ability to operate a device, with cursor finger following and hand gestures in midair.

Using a hand tracking display to operate different devices, brings the future, of sanitary, fun, device input diversity, and safe user hand input, to the present now.

Still further benefits of hand gesture, used to operate different devices, will become apparent from a study of the following description, accompanying drawings, and claims.

BRIEF DESCRIPTION OF THE DRAWINGS—FIGURES

REFERENCE NUMBERS

Figure 1:
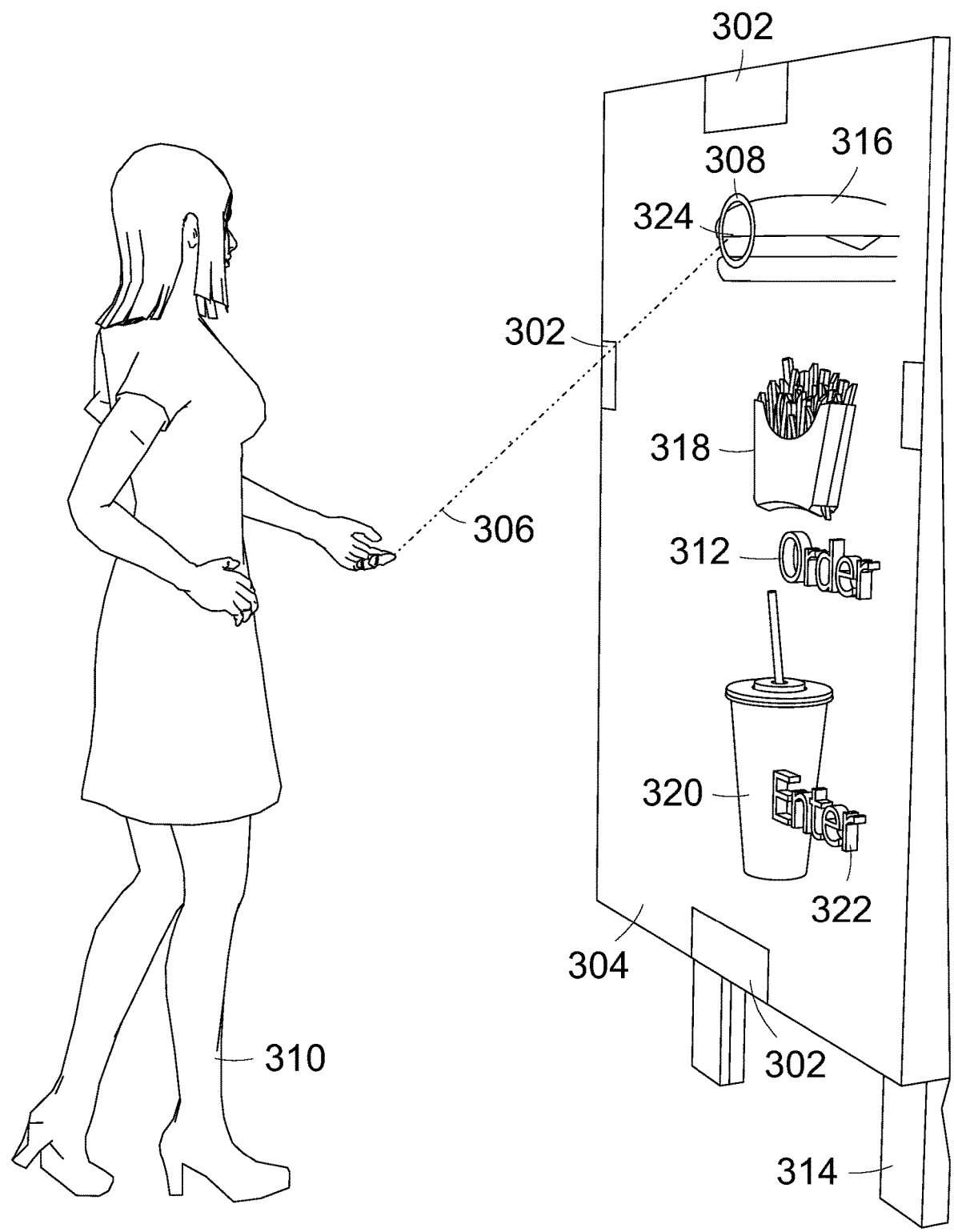
FIG. 1 shows a perspective view, of hand following and hand gestures sensors, connected to a restaurant order input display.

102 hand tracking, and hand gesture recognition sensor
106 virtual connection of cursor to hand
114 a user
116 input icons display
118 a cursor
122 highlighting
130 bidet's operating menu
132 water pressure
134 water temperature settings warm
136 increase water pressure.
138 decrease water pressure
140 front wash
142 back wash
144 toilet
202 hand trackers
204 hand tracking display device
206 hand tracking display
208 inside of an elevator
210 user
212 cursor
214 input icons
218 hand virtual connection to cursor
226 highlighted input icons
302 camera, sensor
304 display
306 virtual line between finger and cursor
308 cursor
310 user's hand's, and fingers
312 start order icon
314 kiosk
316 cheese burgers
318 french fries
320 ginger ale
322 pay enter icon
324 line point
604 display 606 enter input command
608 hand gesture point
610 user
612 hand tracker store checkout payment station
614 hand tracker
618 credit card reader
620 cancel input command
622 number 2 input command
624 hand tracker credit card machine Detailed Description First Embodiment Fast Food Self Serve Restaurant Kiosks Description
Hand Tracker and Finger Gesture Sensor A fast food self-serve restaurant has a kiosk 314 with a display 304, as illustrated in FIG. 1. The display shows, restaurant food and drink menu item, and payment options. A hand tracker, finger follower, and hand gesture, finger gesture sensor, camera, hand gesture radar 302, are positioned to view, to sense a user's hands, and fingers 310, when they present one of their hands at the display, in midair, and within view of the hand trackers.

The hand gesture radar, is connected to a computer, and the computer has hand gesture software, and finger following software. The hand tracker 302 views, and tracks the hand, in mid-air. The hand tracker views and detects the user's hand's, and fingers 310 gestures, in mid-air. The distance that the fingers are detect is from 0.2 to 4 meters, or farther.

Sensors Detect User's Hands

A session to order food items form the kiosk, is activated by the user having one of their hands being viewable by the cameras, or radar sensors.

The camera focuses on the user's right hand, since many users are right handed. If the user wants to use their left hand, they show their left hand to the camera, and fingers, until the display shows a notification that the left is detected and is chosen, by the camera to be the input hand. A sign that a hand is detected, is the hand can move the cursor, or an icon depicting a hand is chosen, can show that a hand has been detected.

The user can use both hands and have a cursor assigned to each hand, the courser can be different to better identify which cursor is assigned to which hand.

If gloves are worn on the hands, the cameras still detected the user's fingers. A distance limit can be set on how far, the cameras detect users' hands, so that users' hands outside, of a group of users operating one display, aren't allowed to input into the display.

Multiple users can operate multiple cursors on the display, at the same time. Two or more users can operate the display at the same time. Each different person's hand can have, a different color cursor, associated to their hand. The user identifies which cursor is theirs, by moving their hand and seeing which cursor follows their hand. Cursors are assigned to each user. The different color cursor has a different color.

Cursor Following Finger

The finger camera, hand tracker is connected to the display computer. The computer has hand, and finger gesture recognition software. The finger camera is part of the kiosk 314 or display 304. The finger camera views the user's fingers.

A cursor, 308 is displayed with input icons, on a display. The cursor follows one of the user's fingers. The cursor is connected virtually to one of the user's fingers, by a virtual line 306. The end of the line point 324 contacts the cursor. The cursor is perpendicular, or at an angle to the finger on the display. The finger moves the cursor to an icon. The finger is moved up or down quickly, or an invisible button between the user's thumb and index fingers can pressed by tapping fingers together, to left click, and activate, the icon, contacted by the cursor.

The cursor, avatar, indicator, pointer, arrow, maker, consists of a spot of light that moves in sync with a mouse, the mouse is the user's hand which moved in midair. The icon is a small picture on a computer screen that the user chooses by hand gesturing in midair in order to open a particular program. The display is an electronic display, screen, or monitor.

For example, the cursor contacts a ham pizza icon on the display. The ham pizza icon is highlighted. The user moves their finger up and down quickly, and the ham pizza icon is left clicked, and activated. The activated ham pizza icon is associated, to activating a function of the hand computer, to have ham pizza, include in the user's order.

The Restaurant's Menu

The restaurant's menu, includes, hamburgers, cheese burgers 316, peperoni pizza, ham pizza, slice of cheese pizza, fried chicken leg, french fries 318, fried chicken breast, bean burrito, beef burrito, salmon sushi, scrambled eggs, hot dog, chili, chicken sandwich, fish sandwich, beef wrap, pork fried rice, shrimp and noodle, salad, egg breakfast, sandwich, salad with chicken, baked potato, meatball submarine sandwich, chicken soup, chocolate donut, coffee, ginger ale 320, coke, orange soda, milk, and water.

Gesture Operating the Menu Display

Each menu item has a picture icon, that is a picture of the item, such as, a beef burrito icon is a picture of the beef burrito. The menu food, and drink icons are inputted by gesture, into an order associated to the user. Items in the order can be remover by gesture inputting the item in the order, which displays a check mark next to the item. The user gestures at a remove item icon, and the check marked item is removed from the order.

Items put on the menu, such, as chicken sandwich, can be removed from the or, by choosing the sandwich displayed on the order, which highlights the sandwich, and then activating a remove icon displayed, with the cursor, and hand gesture, the sandwich is removed from the order.

Self-Serve Restaurant Payment

The hand display shows order payment menu input icons, that include, a cash payment, credit or debit card payment. A product order total price amount is displayed.

The user views the different input commands, on the hand display, such as, a ten-key number pad, amount of purchase, accept purchase amount, enter, and credit card number. A qwerty keyboard can also be displayed to allow the user to try in special orders, or search for special orders, like, cheese burger with extra cheese, an extra onion. The typing is shown on the display. The search results are shown on the display.

The user inputs numbers into the display pad, by individually gesturing at one of the numbers, such as, a number 2. The numbers can be entered, to input a debit card, or credit card pin number into the computer. The input can be shown on the display.

The user views the different input commands, on the display, such as, a ten-key number pad 1, 2, 3, 4, 5-0, amount of purchase, accept purchase amount, enter, and credit card number.

The user inputs numbers into the display pad, by individually cursor finger following and hand gesturing one of the numbers, such as, a number 0. The numbers can be entered, to input a debit card, or credit card pin number into the computer. The input can be shown on the display.

A credit card can be read, by a credit card reader, at the station. The credit card can be read by opening the user's financial account, such as, bank account, electronic commerce (e-commerce) company account, debit card, credit card account over the internet, and paying from the account. The computer inputs a PIN number, inputted by the user.

The payment information is displayed on the display can be used as, a self-serve checkout display, where the user checks out their own purchases. The payment display can also be, a served checkout payment display, where an employee of the restaurant, checks out the user's food or drink purchases, and accepts payment for the purchases.

The data inputted by the user into the hand display, is displayed on the display. The displayed data keep the user informed about the payment stations operation, and interaction with the user. The user can use the displayed data, to adjust the operation of the payment menu, such, changing a personal identification number PIN number if a first number is incorrect.

Connections Between Hand Tracker and Store Computer

The hand display kiosk connects to a hand kiosk computer. The hand computer connects to a restaurant computer. The restaurant computer connects to a restaurant display.

A single computer, can act as the kiosk hand gesture computer and restaurant computer. Connecting to a restaurant employee display, and the hand display. The single computer can connect to multiple kiosks in the restaurant. The order kiosks can each take orders from users at the same time.

The hand kiosk computer has restaurant checkout payment station operating software, computer operating software, and hand tracker operating software.

The hand kiosk computer operates the menu and payment display, and the hand tracker. The hand computer can act as the primary computer, for the menu display, and operate the payment functions, or can connect to the restaurant computer that operates the menu and payment.

Restaurant Employees Viewing the User's Order

The menu items inputted by the user into the hand display, are sent to the restaurant display. The restaurant employees view the user's order. The employees prepare the ordered food. A number or picture, taken by a camera in the kiosk and connected to the computer, of the user is assigned to the user's order. The prepared food can be picked up by the user or delivered, to the user's table.

Transference of bacteria from the payment station touch control panel is reduced, by using the hand menu control panel to order food.

Positions of Multiple Users

The computer with software, and radar, determine the optimal angle of the hand to the displayed cursor, for the user to move the cursor with their hand positioned in midair, for example, 3 users may simultaneously, by moving a cursor assigned to each users hand. A middle user may be located in the middle of the display, when they are standing in front of the display, in relationship to the display. The middle user's cursor maybe best positioned perpendicular, 0 degrees to the user's hand, on the horizontal, and vertical planes. A left user maybe to the left of the user in the, the left user's cursor maybe 35 degrees horizontal, and 0 degrees vertical planes. The right user's cursor may be 320 degrees horizontal, and 40 degrees vertical planes.

A Radar Sensor Used to Detect Hand Gestures

The hand gesture, finger gesture system, uses a sensing technology that uses a miniature radar to detect touchless gesture interactions. An interaction sensor that uses radar for motion tracking of the human hand.

The chip incorporates the entire sensor and antenna array into an ultra-compact 8 mm×10 mm package.

Virtual Tool Gestures Imagine

An invisible button between your thumb and index fingers can pressed by tapping fingers together. Or a virtual dial that you turn by rubbing thumb against index finger. Imagine grabbing and pulling a virtual slider in thin air, by rubbing the thumb up and down on the index finger.

Press a button by putting thumb and index finger together. Dial circular movement, by rubbing index and thumb together. Even though these controls are virtual, the interactions feel physical and responsive. Feedback is generated by the haptic sensation of fingers touching each other. Without the constraints of physical controls, these virtual tools can take on the fluidity and precision of our natural human hand motion.

How does it Works

The sensor technology works by emitting electromagnetic waves in a broad beam. Objects within the beam scatter this energy, reflecting some portion back towards the radar antenna. Properties of the reflected signal, such as energy, time delay, and frequency shift capture rich information about the object's characteristics and dynamics, including size, shape, orientation, material, distance, and velocity.

Radar Signal Visualization with Baudline

The sensor tracks and recognizes dynamic gestures expressed by fine motions of the fingers and hand. In order to accomplish this with a single chip sensor. The sensor uses a radar sensing paradigm with tailored hardware, software, and algorithms. The sensors, do not require large bandwidth and high spatial resolution. The sensor's spatial resolution is coarser than the scale of most fine finger gestures. Sensing principles rely on motion resolution by extracting subtle changes in the received signal over time. By processing these temporal signal variations, the system can distinguish complex finger movements and deforming hand shapes within its field The system software architecture consists of a generalized gesture recognition pipeline which is hardware agnostic and can work with different types of radar. The pipeline implements several stages of signal abstraction: from the raw radar data to signal transformations, core and abstract machine learning features, detection and tracking, gesture probabilities, and finally UI tools to interpret gesture controls.

The system enables developers to easily access and build upon our gesture recognition pipeline. The system libraries extract real-time signals from radar hardware, outputting signal transformations, high precision position and motion data, and gesture labels and parameters at frame rates from 100 to 10,000 frames per second.

Two modulation architectures: a Frequency Modulated Continuous Wave (FMCW) radar and a Direct-Sequence Spread Spectrum (DSSS) radar. Both chips integrate the entire radar system into the package, including multiple beamforming antennas that enable 3D tracking and imaging with no moving parts A Software and Hardware Flow Chart A software and hardware flow chart, includes, a display is connected to a computer, a hand gesture sensor is connected to the computer, the computer has a hand gesture software, the hand gesture sensor is positioned to view a user's fingers, the computer is connected to a self-serve displayed food menu, operations of the self-serve displayed food menu are displayed on the display, the displayed operations describe operations of the self-serve displayed food menu, an avatar is displayed on the display, the avatar overlaps the displayed operations of the self-serve displayed food menu, the computer is configured to associate the detected hand movement in mid-air to movement of the cursor on the display, the computer is configured to detect a hand gesture of the finger, the computer is configured to have the detected finger gesture activate the displayed operation of the self-serve displayed food menu that the avatar is over lapping, activation of one of the displayed operations is associated to activating an operation of the self-serve displayed food menu that is described by the displayed operation, the activated operation of the self-serve displayed food menu effect's the operation of the self-serve displayed food menu, the effected operation of the self-serve displayed food menu is sent from the self-serve displayed food menu to the display, the received effected operation of the self-serve displayed food menu is displayed on the display.

A Software Flow Chart

A software flow chart, includes displaying operations of a self-serve displayed food menu that are different from each other on a display, displaying an avatar on the display, detecting a user's hand movement in midair, moving the avatar in relationship to a detected movement of a user's hand, contacting the displayed operations with the avatar, detecting a hand gesture of the user in midair, activating the displayed operation contacted by the avatar by the detected user's hand gesture, sending the activated operation to the self-serve displayed food menu, influencing the operation of the self-serve displayed food menu with the received activated operation, sending a description of the influenced operation of the self-serve displayed food menu to the phone.

Fast Food Self Serve Restaurant Kiosks Operation

The user uses finger cursor following and hand gesture to activate, the start order icon 312, as illustrated in FIG. 1. The items that the user orders are part of the order. The order is assigned to the user, with a number, or a picture of the user taken by a picture camera in the display. The order is viewed by the employees.

The User Uses their Hand Gesture to Activate the Displayed Icons

The user uses their hand gesture to activate the displayed icons, that they want activated. The user gestures with their hands at the one of the displayed icon items, that they want to activate, such as the french fries input icon.

The displayed cursor follows the user's finger to the item to be ordered, on the display. The input icon is activated, left clicked by putting thumb and index finger together, or the finger is flicker, moved forward and backward, which clicks the item that the cursor is over laying. The french fries icon is clicked and activated. The activated fries, is put on the user's order.

The user can active another icon command, after the first command is activated, etc. Other commands include, a cancel icon, and the number 2 input number. The user completes their order, moves the cursor to and gestures at a finish and pay enter icon 322. The user pays with the credit card and waits, for their order to be prepared. The user can be pickup in the restaurant, or it can be delivered to a booth, or table the user is sitting at.

Example of Restaurant Operation

The user uses move the cursor to the icon and hand gesture the restaurant icon to activate, the start order icon. A menu is displayed. The items that the user orders are part of the order. The order is assigned to the user, with a number, or a picture of the user taken by the camera. The order is viewed by the employees.

The user uses their finger to move the cursor to the icon that they want activated. When the cursor contacts the icon the icon is highlighted, reinforcing the view of the cursor in contact with the icon, with the two visual feedbacks of the cursor's contact and highlight, the user knows the cursor has contacted the icon.

The user uses their finger to move the cursor to the icon and hand gestures their fingers on one of the displayed icon items, such as the soda drink input icon. The soda drink icon is clicked and activated. The activated soda drink item is put, on the user's order.

The user can active another icon command, after the first command is activated, like, fries, 7up soda, coffee, etc. Other commands include, cancel, change order which allows the user to delete, remove items put on the order. The change icon can also be used, to activate icons that are increase order size icons, like, make the drink a larger size, or fries to a larger size, extra cheese, or extra ketchup. Numbers 0-9 icons on a ten-icon pad, can be imputed for number of items, like, three 3 chicken sandwiches, or 2 strawberry milk shakes.

The user uses move the cursor to the icon and hand gesture, contacts the ham pizza icon, on the display. The ham pizza icon is highlighted. The hand gestured ham pizza icon is left clicked and activated. The activated ham pizza icon is associated, to activating a function of the computer, to have ham pizza, include in the user's order.

The user completes their order and hand gestures, a finish and pay enter icon. The user pays with the credit card that is on their phone. The restaurant receives the paid order. The user waits for their order to be prepared. The restaurant sends the kiosk or restaurant display a notification that the order is ready. The user can pick up the order in the restaurant, or it can be delivered to a booth, or table the user is sitting at.

Alternate Embodiments

Figure 2:
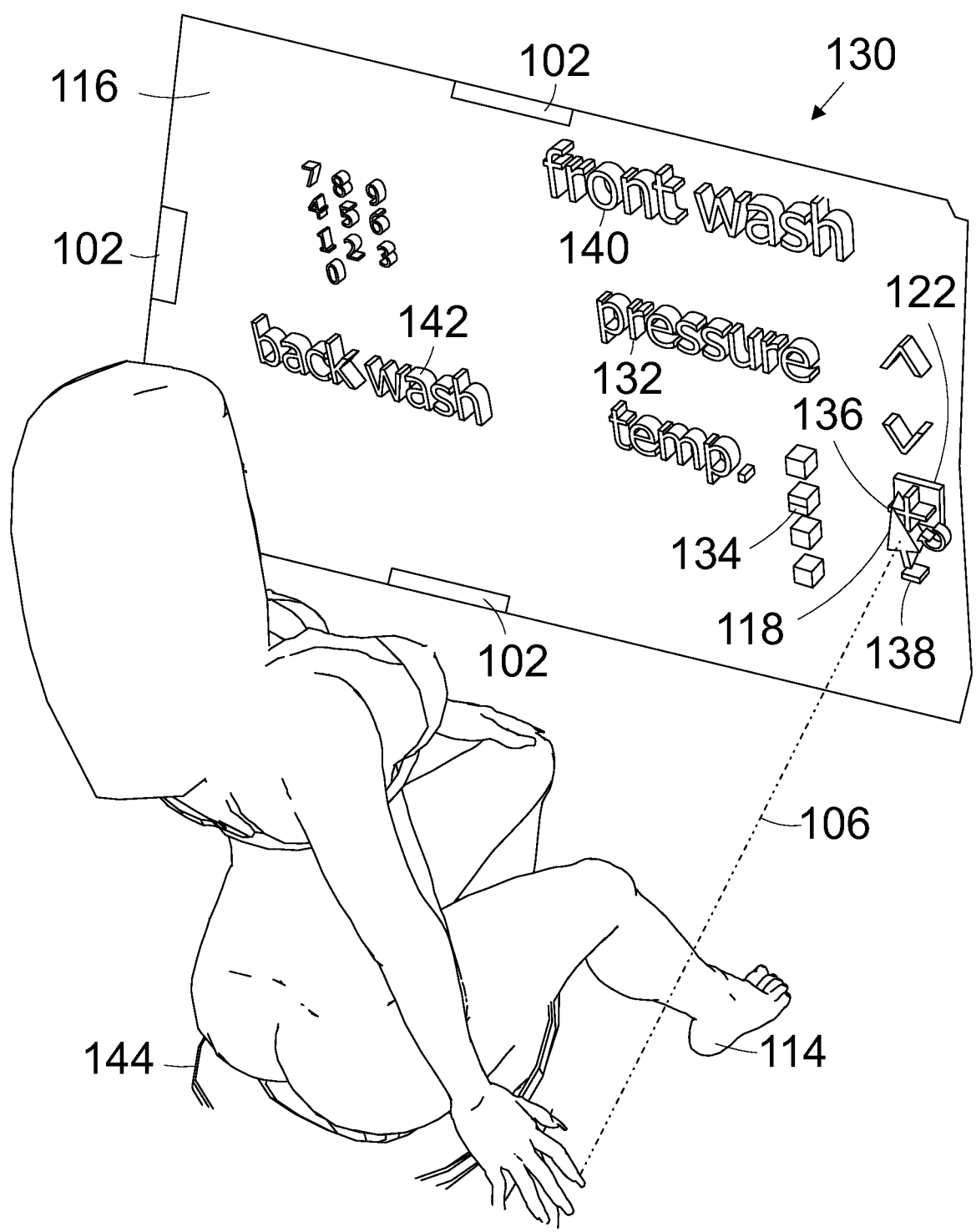
FIG. 2 shows a perspective view, of hand following and hand gestures sensors, connected to a smart toilet input display.

Cursor Finger Following, and Finger Gestures Used to Operate a Smart Toilet Description A display 116, has a hand tracking, and hand gesture recognition sensors, cameras 102, as illustrated in FIG. 2. The sensors are connected to a computer in the display. The hand sensor is attached to the display, and views a user's hands 114, in mid-air. The computer is programmed with midair hand tracking, and hand gesture software.

An input panel is displayed on the display. The input panel is viewable by the user. A cursor is display, with the input icons.

The user moves the cursor, to an icon to be activated, by hand or finger movements in mid-air. The user gestures input the icon button by putting thumb and index finger together, or up and down with their finger, in midair, to activate the icon contacted by the cursor. The cursor 118 follows 106 the user's hand movement. The cursor is virtually connected 106 to hand. The user moves to the cursor to the icon, they want to activate. The icon highlights 122, when the cursor contacts the icon.

The user left clicks the icon by moving their finger forward and back. The finger forward and back movement is detected by the sensors, and is interpreted by the computer as an input, left click of the icon contacted by the cursor 118. The finger forward and back movement, gesture, left clicks the icon, which activates the icon.

Toilet Menu Options

The user chooses toilet menu options, by positioning the pointer over the desired menu option on the display, with their hand, such as, the front-wash icon 140. The user finger gestures, and the front wash icon is left clicked, and the front-wash icon 140 is activated.

The activatable operations of the toilet's electronic bidet, or icons which describe or represent, and operation of the bidet are shown on the display, like, a drawing of water directed at the user back position, is associated to activating a stream of water by the bidet at the users back position.

The activation of the icon, is associated to activating the device, toilet function, electronic bidet in the toilet, associated to the icon, the front-wash. The computer sends the toilet, the activated device function, front-wash. The toilet actives the toilet he front-wash function of the bidet, with the received activated front-wash function.

More Toilet Menu Options

An activated displayed icon command activates a smart toilet's operation associated to the icon command, for example, cursor finger following and hand gestures of a smart toilet icon command activates the command being hand gestured, for example, activation of a displayed increase water temperature icon, activates the increase water temperature operation of the electronic bidet in the smart toilet, the increased water temperature operation increases the water temperature of the water flowing from the bidet.

An activation of a decrease water temperature icon activates, the decrease water temperature operation of the bidet in the smart toilet, the decreased water temperature operation decreases the water temperature of the water flowing from the bidet. The commands can be displayed as being on a scale of 1-10, with 10 being the highest temperature.

An activation of a back-wash icon activates, the back-wash operation of the bidet in the smart toilet, the back-wash operation directs water flowing from the bidet at the users back elimination position, anus. An activation of a front-wash icon activates, the front-wash operation of the bidet in the smart toilet, the front-wash operation directs water flowing from the bidet at the user's front elimination position, female bladder opening.

An activation of a decrease water pressure icon activates, the decrease water pressure operation of the bidet in the smart toilet, the decreased water pressure operation decreases the water pressure of the water flowing from the bidet. An activation of an increase water pressure icon activates, the increase water pressure operation of the bidet in the smart toilet, the increased water pressure operation increases the water pressure of the water flowing from the bidet.

Other commands associated to an operation of the bidet, and the operations description, include oscillating water spray pattern, and pulsating water spray, increase or decrease the time of the front or back wash with a displayed clock, warm wash, hot wash, cool, wash, start, stop, bottom dryer temperature increase, bottom dryer increase air flow.

The smart toilet's computer carries out, the input request of the user. For example, the user hand gestures the back-wash icon. The back-wash input is detected by the sensor and the computer. The phone's computer directs the smart toilet computer, to start a bidet backwash.

Icons Give Visual Feedback

The control panel can be enlarged or minimized by the user's hand gestures. The icons give visual feedback, that they are being touched, or have been touched by the cursor. The icons give visual feedback, that they have been activated, such as, changing color, dimming, changing shape, moving, decreasing in size, moving farther away from the user, and showing text. The icons can change color, or size, when being activated, or touched by the cursor.

The input icons can be visually pleasing, such as, being similar to a rabbit, a flower, and a person's face. The user can set, and input the shape, avatars, movements, activation actions, and colors used for the buttons.

Talking Icons

The icons can move, change shape, and be animated, for example, the icons can be, a moving, and talking, cartoon character, such, as bugs bunny, or Lisa Simpson. A speaker in the display, can broadcast, the characters talking.

The talk, or vocalizations of one of the characters, can describe the input button's function, that the character is associated to, such as, the character can, i can increase, the water temperature.

The user can identify each hologram by identifying each hologram from each other hologram, by visually having each hologram be different from each other hologram Sound Feedback Sound can be associated to the gesture of each icon, such as, a bell note, music, a cat's meow, and a chime. Sound can be associated to the activation of the input, such as, a piano note. The sound is broadcast, from the speaker in the display.

The sound lets the user know that they have been gestured at, and or activated the icon. The user can set, and input the sounds associated to the icons More Possible Devices Operated by the Midair Finger Input Display In an apartment, office building or house the available controllable devices would be displayed on the hand gesture display, such as, an on off switch for the following devices, lights, TV, radio, dishwasher, stove, and microwave oven. The apartment devices can be operated using the screen. The hand gesture display, unlock the doors, and start or stop the car's engine. Devices in an industrial work environment can be operated by the hand gesture display screen, such as, a milling machine, lathe, or press.

The hand gesture display can operate multi user devices, such as, an on off switch, house lights, house door bell, office door locks, house door locks, car door locks, an airplane control panel. The devices can be programmed to allow only certain users to operate the device, such as, only employees in an office would be allowed to operate an office printer. For example, only certain users would be able to operate a on off switch for a hospital x-ray machine. The portable hand gesture display controls lights in apartments, office rooms, interior, and exterior lights.

An Example of Display Operation

The display is connected to the smart toilet bidet. The smart toilet's operating input icons, are displayed. A two-dimensional 2D, or three-dimensional 3D back wash smart toilet icon, is displayed. The bidet directs water at a user's elimination areas, to wash them.

The cursor moves to the icon. The backwash icon highlights. The user finger gestures at the backwash icon. The user finger gestures while the cursor contacts the backwash icon. The backwash icon is left clicked and activated.

The activation of the back-wash icon, is associated to a command, to activate of the back-wash function of the toilet. The computer sends the toilet, the activated back wash function to the toilet. The toilet actives, the back-wash function of the toilet. The user is washed, with the toilet back wash, as they sit on the toilet.

A Tool Bar to Associate Inputs to Hand Gesture, Like Left Click

A tool bar is displayed, that has commands that are associated to the hand gesture. The commands include, right click, left click, double left click, scroll, zoom, and keyboard select.

A command associated to the hand gesture operates, when the user hand gestures at an icon, such as, the user activates the left click, so that hand blinking, left clicks an icon, that is gestured at.

Left Click on Continuously or for One Use

The left click command can be sticky, on continuously for the hand gesture, or a one-time left click. The left click command is activated, by blinking at the tool one time. The activation of the one use left click is graphically displayed.

To have continuous left click operation, blinking at the left click tool two times. The activation of the continuous left click operation, is graphically displayed.

With continuous left click operation, input icons that the user gestures at and are blinked, are left clicked. This activation method is the same for right click, double left clicks, and zoom, being associated to the hand gesture.

Broad Description of the Hand Input System

A display is connected to a computer. A sensor is configured to detect a hand movement. The sensor is connected to the computer.

Input icons are generated by the computer. The input icons are displayed on the display. The input icons are different from each other.

A device is connected to the computer. The device has functions that are different from each other. The input icons are associated to functions of the device.

A cursor is generated by the computer. The cursor is displayed on the display. The computer is configured to associate the detected hand movement to movement of the cursor on the display. The cursor is contactable with the input icons.

The computer is configured to associate the detected hand movement to movement of the cursor on the display. The computer is configured to associate a hand gesture to activation of one of the input icons that is contacted by the cursor.

The activation of the input icon is associated to the activation of the function of the device associated to the input icon. The activation of the function of the device is associated to an influence on the operation of the device. The influence of the operation of the device is displayed on the display.

The hand gesture can be a movement of the user's finger forward and backward, or by putting thumb and index finger together. The hand gesture can be a movement of the user's finger up and down. The hand gesture can be a movement of the user's finger from one side to another side. The hand gesture can be a movement of the user's finger is in a circular motion.

The device can be a smart toilet, an automatic teller machine, a restaurant order menu device, a self-driving car, an elevator, an on off switch, a gas pump, a store checkout machine, a device in a flammable environment, a device in a dust free environment.

Cursor Finger Following, and Finger Gestures Used to Operate a Smart Toilet Operation Smart Toilet Example The user operates a smart toilet 144, having an electronic bidet, as illustrated in FIG. 2. The bidet's operating menu 130 is displayed. The menu shows input icons, whose functions are associated, to operations of the toilet. An activated icon input, operates the associated toilet device. The menu shows input options such as, front wash 140, back wash 142, water temperature settings warm water 134, water pressure 132, water pressure increase 136, or water pressure decrease 138.

The user hand moves a displayed cursor, to a displayed back wash setting icon, and gestures their hand 114 by putting thumb and index finger together, or up and down, to activate, the back wash setting 142, a warm water temperature setting, and increases the water pressure, and a start icon.

The bidet starts the directing of warm water, at the user's back position. The toilet's display, shows the operation of the toilet.

Example of Smart Toilet Operation

The user uses cursor finger following and hand gestures to activate the front wash icon, the warm wash icon, the low-pressure icon, start icon. The bidet directs water to the user's front position. The user hand gestures the increases temperature icon, and increase time, by 28 second. The water temperature is increased, and the time of the water being sprayed ins increased. The water stops when the displayed time is ended. The air dryer starts when the water stops. The user hand gestures the stop button, to stop the air dryer, the air dryer stops. The user vacates the toilet.

Figure 4:
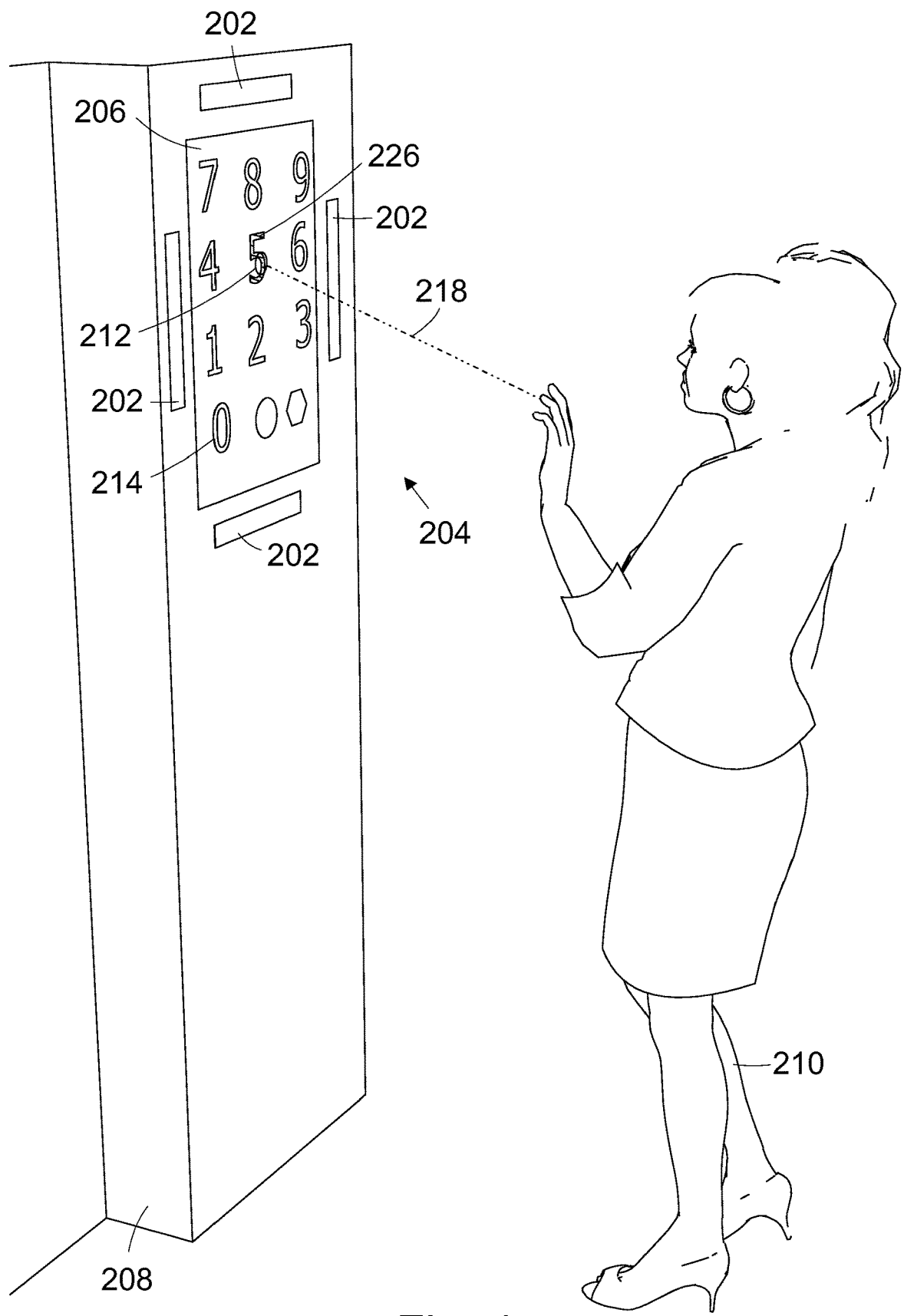
FIG. 4 shows a perspective view, of hand following and hand gestures sensors, connected to an elevator input display.

The user uses hand gestures and cursor finger following to activate, a back-wash setting, a warm water temperature setting, and increases the water pressure, and a start icon. The bidet starts the directing of warm water, at the user's back position. The toilet's display, shows the operation of the toilet, doing the warm water, and back wash operation Hand Tracker Elevator Description A hand tracking display device 204, is illustrated in FIG. 4. One hand tracker 202, or a multitude of hand trackers 202 are used to monitor two or more user's hands in mid-air, while inside an elevator 208.

The hand tracker monitors multiple users' gestures in mid-air, as shown in FIG. 2. The hand tracker views each user's hands 210. The user's hands are detected gesturing 210 at an input icon, on an elevator input display 206, that is contacted by the cursor. The icon is highlighted 226. The user finger gestures, forward and back, in mid-air, with their finger, and the icon is activated. The input icons 214 can be activated by being highlighted 226 by one or more cursors, controlled by multiple users' hands movements 216, and activated by the finger gestures of the users.

The user moves the cursor, by the cursor following the user's hand in mid-air, to an icon to be activated. When the cursor contacts the icon, the user gestures by putting thumb and index finger together, or up and down with their finger, which activates the icon A Cursor Following the User's Gesture on the Display In another embodiment, shown in FIG. 3, a user can move a curser 212 that is a picture, or attractive caricature of the user's face, so the user knows which curser is associated to their hand gesture.

A picture camera is connected to the hand tracker computer. The picture camera takes a picture of the user, when the tracker detects the user's gesture, and assigns the picture to the cursor that is assigned to the user. Multiple users using the display at the same time, each have a picture of themselves assigned to the cursor, that is assigned to them.

The cursor 212 is moved to the desired input icon, and clicked, or activated by the gesture of the finger at the icon. For example, the icon is highlighted 226 by contact with the cursor. The user finger gestures, and the icon is activated.

Highlighting the Icons Before Activation

The input icons 214 can also be highlighted 226 by one, or more the users finger moving the cursor 216, and activated by the gesture of the users.

In another embodiment one of the icons is highlighted by the user's gesture, and an enter icon is gestured, in mid-air, at to activate the highlighted icon.

The Computer can Monitor Multiple Users

The hand tracker, or hand trackers are connected to a computer. The computer has a hand tracker software. The computer can monitor multiple users, with one hand tracker.

The computer monitors multiple users, by using more than hand tracker. Two or more users can input into the display at the same time. Two or more cursors can be operated on the display. Two or more of the displayed cursors, can be highlighted at the same time. A computer file can be created for each user, in the file, the user's input history is stored.

Elevator Call Box Outside Elevator

The call box displays an either up or down icon, for movement up or down. The elevator call display, is located on a floor of a building, that the user is on. The elevator call control panel is shown, on the elevator call display. One hand tracker, or a multitude of hand trackers are used to monitor two or more user's hands, while outside of the elevator. The elevator control panel located on a floor outside of the elevator. The control panel is used to call the elevator to the user's floor, with displayed up or down commands.

Elevator Control Panel Inside Elevator

The panel shows elevator inputs. Numbers for different floors of a building are shown on the display, such as, 1, 2, 3, 4 and 5, etc. The activation of one of the numbers, directs the elevator the activated floor number.

Close or open door symbols are displayed, which when activated open or close the elevator door. An emergency stop button is displayed, which when activated, stops the elevator. A shown communication button, allows the user to talk to elevator help personal.

Commands include, basement floors, parking, ground floor, 1, 2, 3, 4, 5, 6 7, 8 etc., close door, open door, emergency button, user help call, elevator stop, start, and fan. The number 1 elevator operation moves the elevator to the 1st floor. The open-door operation opens the door of the elevator. The stop icon stops, the elevator.

The commands are self-explanatory, descriptive of their association to the operation of the elevator, that they are associated to, such as, the fan button, when activated turns on the fan, when the fan is off, or turns off the fan, if the fan is on.

Input buttons, input icons, input text, that is looked at, or gestured at, is highlighted, or the button changes color, or enlarges, or changes shape, or an audio sound is emitted. The user continues their gesture at the button, the button is activated, and the button changes to a different state, such as, a color, or enlarges, or changes shape, or an audio sound is emitted.

The Hand Tracker May Work Optimally at Various Distances

The hand tracker may detect gesture optimally when it is parallel to the user's hands at a distance from about 45-100 cm. Screens 12.3 inch to 27-inch screen are may be optimal. Best view of the user's hands may be within 45 degrees, of the tracker.

Different Displays can be Used

The display can be two dimensional displays, which include: Plasma display panel (PDP), Liquid crystal display (LCD), and Organic light-emitting diode display (OLED), Three-dimensional displays can be, a head up display projected on a window shield, a Holographic display, and a Light field displays.

Programming

Various programming languages can be used to program the computer 106, such as, C++, C#, Java. Computer program code for carrying out operations of the object detection and selection mechanism may be written in any combination of one or more programming languages, including an object-oriented programming language such as Java, C++ or the like and conventional procedural programming languages, such as the "C" programming language or similar programming languages.

The program code may execute entirely on the computer, partly on the computer, as a stand-alone software package, partly on the computer and partly on a remote computer or entirely on the remote computer or server. In the latter scenario, the remote computer may be connected to the computer through any type of network, including a local area network (LAN) or a wide area network (WAN), or the connection may be made to an external computer (for example, through the Internet using an Internet Service Provider).

Communication Links

The display computer, and elevator computer, each may include a wired or wireless network interface through which they can connect to the access point. As an example, the device may be configured to connect to access point using one or more protocols such as 802.11, or Wi-Fi direct.

Furthermore, the display, and elevator each may be configured to connect to access point using multiple wired and/or wireless protocols, such as 3G or 4G or 5G data connectivity using a cellular communication protocol (e.g., CDMA, GSM, or WiMAX, as well as for "Wi-Fi" connectivity using 802.11). Other examples are also possible. Alternatively, the host may also include connectivity to the internet, and thus, they may access the internet through the host.

The computer may further include on-board data storage, such as, memory coupled to the processor. The memory may store software that can be accessed and executed by the processor, for example. The host may be any type of computing device or transmitter including a laptop computer, a mobile telephone, that is configured to transmit data to the device. The host and the device may contain hardware to enable the communication link, such as processors, transmitters, receivers, antennas.

The computer can use artificial intelligence software. The computer may be a quantum computer. The computer can be located at a remote location, connecting to the devices over the internet. The elevator may connect to a quantum computer over the internet.

The computer readable medium may include non-transitory computer readable medium, for example, such as computer-readable media that stores data for short periods of time like register memory, processor cache and Random-Access Memory (RAM). The computer readable medium may also include non-transitory media, such as secondary or persistent long-term storage, like read only memory (ROM), optical or magnetic disks, compact-disc read only memory (CD-ROM), for example.

The computer readable media may also be any other volatile or non-volatile storage systems. The computer readable medium may be considered a computer readable storage medium, for example, or a tangible storage device.

How Other Hand Trackers Function

The hand tracker consists of hand tracker cameras, projectors, and algorithms. The projectors create a pattern of near-infrared light on the hands. The cameras take high frame rate images of the user's finger and patterns. The image processing algorithms find specific details in the user's hands and refection patterns. Based on these details mathematical algorithms calculate the hand's position and gesture point, for instance on the displayed input icon. The hand tracker is connected to the computer.

The hand tracker can also be an ultrasonic sensor, that send out ultrasonic sound waves, a sound radar, that bounce, or are reflected off the user's fingers, and the bounced, sound waves are detected by the sensor, and are used to develop an image of the user's fingers in midair.

The hand tracker can also be a camera, that views the user's fingers in midair, and detects the finger's location and detects the finger's gesture, with a hand gesture software in the computer. The user's hand gestures can be detected from 0.2 to 5 meters, or farther.

Finger Gestures

The finger moves a cursor to contact a number 1 floor icon on the display. The 1 icon is highlighted. The user moves their finger down, or forward, or up and down, or forward and back, or to a left side and back, quickly, or putting thumb and index finger, or other finger together, any of these gestures are interpreted as a touch of the icon that the cursor is superimposed on. The 3 icon that the cursor is on is left clicked and activated. The activated 1 icon is associated, to activating a function of the elevator to move the 1 floor.

Hand Tracker Elevator Operation

The user 210 is in view of the display 206, as illustrated in FIG. 4. The hand tracker 202 views the user's hands and determines, the point 218 that the user is gesturing at on the display.

Inside the Elevator

While inside the elevator 208, the user they are in view of the hand tracker, and hand gesture recognition camera. The display displays floor buttons, that they want to activate. The fingers movements move the cursor, to the 5 fifth floor button. The 5 button is highlighted 226. The user gestures at the number 5 fifth floor button, by moving their finger clock wise. The gesture at the 5 button, and activate the 5 button, and it changes color. The elevator moves the fifth floor, and the doors open.

While inside the elevator 208, the user views of the display floor button, that they want to activate. Using the cursor 212. The cursor flows the user's finger 218, and moves to, and contacts, or overlays, the number four 4, The 4 button is highlighted 226. The cursor contact is continued with the 4 button.

The user gestures at the number 4, by crossing their fingers, the 4 button is activated, and changes color. The elevator moves the 4th floor, and the doors open.

Calling the Elevator Outside the Elevator

To call an elevator to a floor the user is on. The user's finger movement moves the cursor to the elevator up, or down button, shown on the call display. The up button is highlighted, up contact with the cursor. The cursor contact highlights the up button. The user gesturing at the up button, by making a fist, and the up button is activated. The elevator is called the user's floor, going in the up direction.

Cursor Following Finger

A cursor is displayed with the input icons. The cursor follows one of the user's fingers. The cursor is perpendicular, or at angle to the finger on the display. The finger moves the cursor to an icon. The finger is moved up or down quickly, to left click, and activate, the icon, contacted by the cursor.

A camera or hand gesture radar, and is connected to the display computer, and the computer has a hand gesture software. The camera is part of the display. The camera views the user's fingers.

The cursor contacts a number 3 floor icon on the display. The 3 icon is highlighted. The user moves their finger down, or forward quickly, and the 3 icon is left clicked, and activated. The activated 3 icon is associated, to activating a function of the elevator to move the 3 floor.

Hand Tracker Store Checkout Payment Station Description

Figure 3:
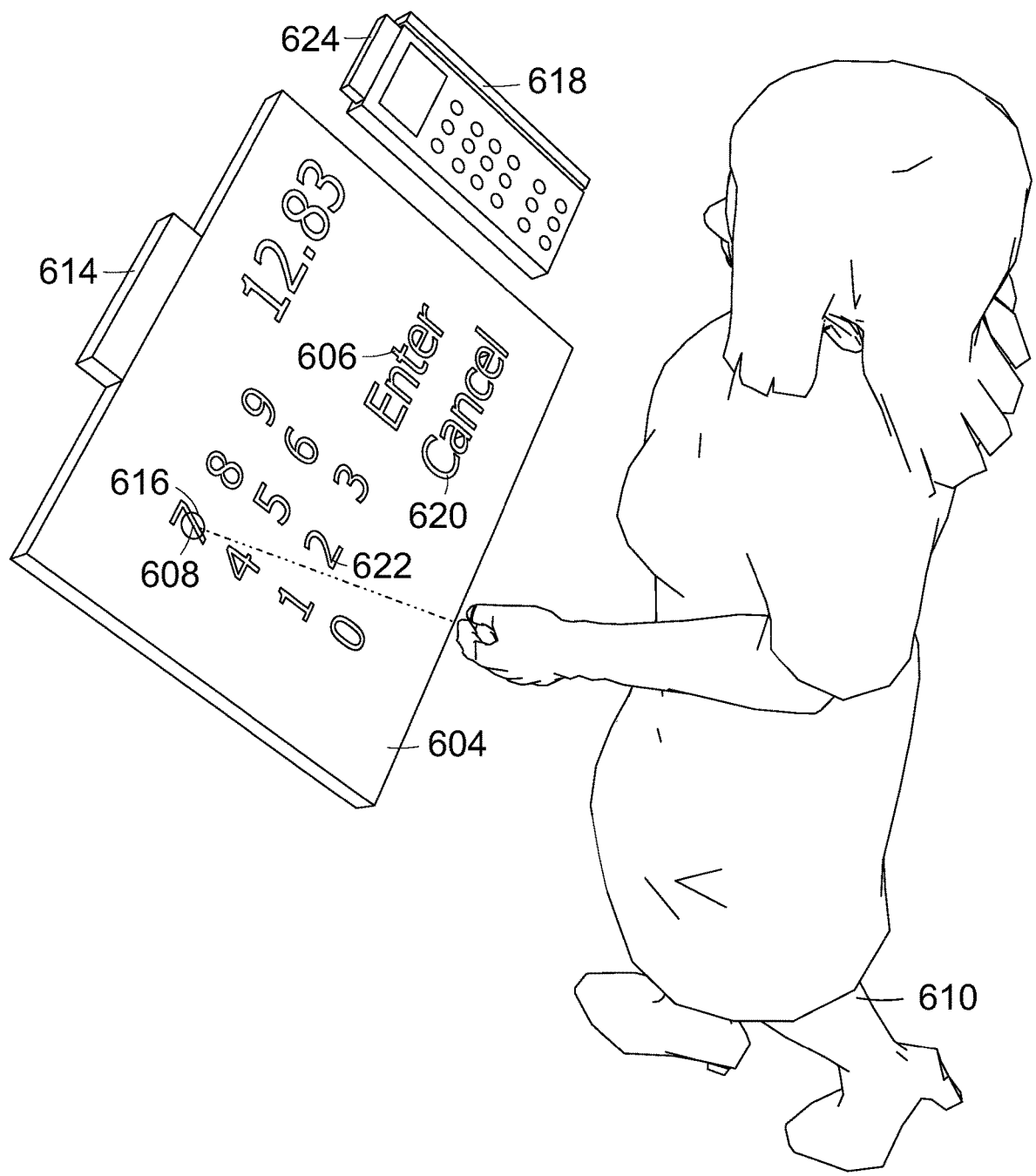
FIG. 3 shows a perspective view, of hand following and hand gestures sensors, connected to a store checkout input display.

A store checkout payment station 612 has a display 604, in FIG. 3. The display shows, a store checkout payment station control display panel. A hand tracker 614 views a user's hands 610 in mid-air, when they are in view of the display.

A displayed cursor 616 follows a user's hand as it moves in midair. The user's hand has virtual connection 608 to the cursor.

A camera or hand gesture radar, is connected to a computer, and the computer has a hand gesture software. The camera is part of the display.

Gesture in Mid Air Operating the Payment Station

The panel shows store checkout payment input icons, include, a cash payment, credit or debit card payment. A total products price amount area is displayed.

The user views the different input commands, for the payment station, such as, a ten-key number pad, amount of purchase, accept purchase amount, enter, and credit card number.

The user inputs numbers into the display pad, by individually gesturing in midair, at one of the numbers 622, such as, a number 2, with the cursor contacting the number 2. The numbers can be entered, to input a debit card, or credit card pin number into the display computer. The input can be shown on the display 604.

A credit card can be read, by a credit card reader 618, at the station. The read has a credit card hand tracker 624. The card hand tracker allows the user to use gesture, to input into the credit card reader.

The credit card can be read by opening the user's financial account, such as, bank account, electronic commerce (e-commerce) company account, debit card, credit card account over the internet, and paying from the account. The computer inputs a PIN number, inputted by the user.

Self-Serve Store Checkout

The payment station can be, a self-serve store checkout payment station, where the user checks out their own purchases. The payment station can also be, a served store checkout payment station, where an employee of the store checks out the users purchases.

With employee check out, the employee had an employee display, and views the user's purchases. The employee display is connected, to a store computer. The store computer is connected, to a display computer.

The User Scans Items

A product scanner is connected to the hand computer. The scanner identifies bar codes on the products. The scanned items, and prices of the items, are put in an order, containing the products that the user is purchasing. The order is displayed on the hand display. The prices of the products, are added together to calculate a total price for the products.

Store items can include, socks, milk, bread, coffee, shoes, multi vitamins, bread, toilet paper, mints, gum, frozen vegetable, bananas, apples, orange juice, hot dogs, cat food, dog food, car oil, pants, shirts, jackets, shorts, tennis rackets, hamburger, salmon, dish washing soap, potation chips, chicken soup, spinach, canned beans, bran cereal, potatoes, onions, avocados, celery, mushrooms, blueberry pie, pizza, french fries, and ice cream.

Connections Between Hand Tracker and Payment Station

The display connects to a display computer. The display computer connects to the store checkout payment station. The display computer has store checkout payment station operating software, computer operating software, and hand tracker operating software.

The display computer operates the payment station, the display, and the hand tracker. The display computer can act as the primary computer, for the payment station, and operate the payment station, or can connect to a store computer that operates the payment station.

The data sent from the payment station is displayed on the display. The displayed data keep the user informed about the payment stations operation, and interaction with the user. The user can use the displayed station data, to adjust the operation of the payment station, such, changing a personal identification number PIN number if a first number is incorrect.

Transference of bacteria from the payment station touch control panel is reduced, by using the mid-air menu control panel in influence the operation of the payment station.

Store Checkout Payment Station Operation

The user 610 uses their hand gesture to activate the displayed commands, that they want activated, as illustrated in FIG. 3. The user gestures 608 with their hands at the one of the displayed items, that they want to activate, such as the enter input icon command 606. The user moves the cursor to contact the enter command. The gesture is made at the enter command, and the enter icon 606 command is clicked, and activated.

The user can active another icon command, after the first command is activated, etc. Other commands include, a cancel command icon 620, and the number 2 input number 622. The hand tracker 614 views, and tracks, the user's hand's gesture 608. The hand tracker detects the user's gesture, if the user wears glasses.

Cursor Following Finger

The is cursor displayed with the input icons. The cursor follows one of the user's fingers. The cursor is perpendicular, or at an angle to the finger, in midair, on the display. The finger moves the cursor to an icon. The finger is moved up or down quickly, to left click, and activate, the icon, contacted by the cursor.

The cursor contacts a finish and pay icon on the display. The finish and pay icon is highlighted. The user moves their finger up and down quickly, or by putting thumb and index finger together, and the finish and pay icon is left clicked, and activated. The activated finish and pay icon is associated, to activating a finish and pay function of the payment station.

Example of Checkout Machine Operation

The checkout machine icon is activated, by cursor and hand gestures by the user. The activated checkout machine icon activates, the displaying of the checkout machine's control panel.

The control panel for the checkout machine is displayed. The user cursor and hand gestures the start icon on the panel, and the start screen is displayed. The user scans a can of soup, the price and soup are displayed. The user cursor and hand gestures checkout icon, the user inputs 3 bags purchased. The pay icon is cursor and hand gestured.

Hand Tracker Gas Pump Description

A gas pump has a display. The display shows, a gas pump control display panel. A hand tracker views a user's hands when they are in view of the display.

A camera or hand gesture radar, and is connected to the display computer, and the computer has a hand gesture software. The camera is part of the display. The camera views the user's fingers.

The panel shows gas pump operating input icons, which include, an 87, 89, and 89 octane input icons, or regular, plus, or high-octane gas input icons. A gas price amount area is displayed. A credit card payment icon is displayed.

Gas pump Product Choices

Displayed commands include, octane of gas 87, 89, 91, 93, 94, price gas per or liter or gallon, pay with credit card or cash. pay with phone wallet.

The display receives feedback information, that is displayed, while the gas pump is operating, such as, how much gas is being pumped, how much is the cost of the gas being pumped.

The display connects to a computer. The computer connects to the gas pump. The computer has gas pump operating software, computer operating software, and hand tracker operating software. The computer operates the gas pump, the display, and the hand tracker. The computer can act as the primary computer for the gas pump, and operate the gas pump, or can connect to a gas pump computer that operates the gas pump.

Hand Tracker Gas Pump Operation

The cursor follows the user's hand gesture, and moves to, and contacts, or overlays, the number 89 gas octane icon. The user gestures at the 89 icon. The gesture with the cursor contacting the 89 icon, activates the 89 icon. The activated 89 gas icon, activates the pump. The activated pumps allow the user, to pump the gas into the user's car.

In another embodiment, the 89 icon is highlighted by the contact with the cursor, and enter icon is gestured at to activate the 89 icon. The gas pump is activated to dispense gas to the user's car.

Or in another embodiment the cursor isn't displayed. A highlighting of the icons shows the user, which icons are being activated by an invisible, not displayed cursor. The user chooses, and gestures at the 89-octane gas icon. The 89 icon is highlighted. The user finger gestures at the 89 icon, and the icon is activated.

The User Uses Gesture to Pay at the Pump

The user uses gesture to pay at the pump with their credit card. A total price for the gas dispensed, to the user's car is shown, such as, 20 dollars. The user uses gesture, to activate the credit card payment method. An icon displayed on the display, may use a descriptor, such as, pay with credit card.

The user inserts the user's card into a credit card reader, or swipes, places the card near a near radio frequency identification (RFID) card reader, to read the user's card information. The card information pays the purchase amount.

Example of Gas Pump Operation

The user picks one of the gas pumps, from many gas pumps. The user moves the cursor and hand gestures, at the gas pump icon that's says pump number 3, to open the 3 pump's control panel.

The user cursor and hand gestures the 87-gas octane icon, and the 87 is highlighted. The pump is turned on. The user pumps gas into a car. The user pays by cursor and hand gestures the credit card pay icon, the credit card on a phone is charged for the payments.

Hand Tracker Automatic Teller Machine Description

A hand tracker is connected to a computer. A display is connected to an atm computer. An automatic teller machine atm, is connected to the computer. The computer can act as the primary computer for the atm, and operate the atm, or can connect to a computer that operates the atm.

The hand tracker 614 views a user's hands 610 in mid-air, when they are in view of the display. A displayed cursor follows a user's hand, the cursor moves in relation to the hand, the cursor's movement is synchronized with the hand's movement, as the hand moves in midair. The user's hand has virtual connection to the cursor.

The computer is programmed with an atm operating software, a hand tracker software, a hand gesture software and a computer operating software. The computer is connected to an internet, for communicating to atm devices, servers, or other computers over the internet.

Detection of a User's Gesture

The hand tracker and or hand gesture radar is positioned to detect a user's gesture at the display. At within 2 meters of the user's gesture, the hand tracker can detect the user's gesture at the display. At 45 degrees within the user's gesture at the display, the hand tracker detects the user's gesture. Multiple hand trackers can be used to increase the detected gesture angle to 130 degrees. The hand trackers, can be positioned at different areas around the display, to detect the user's gesture angle, or multiple user's gesture angles at the display.

Input icons, or input buttons are displayed on the display. The hand tracker detects the user's gesture at one or more of the icons. The icon gestured at is activated.

Verifying a User's Identity

The user's identity, can be verified by the ATM, by ways that are preprogrammed into the ATM system, such as, the user inserts their ATM card in the ATM card reader, or communicates their identity to the ATM wirelessly with a smart phone, by using Radio-frequency identification (RFID) Near Field Communication (NFC) radio, communicating their identity to the ATM, or the ATM viewing the user's face, and identifies the user, by using facial recognition, or iris recognition can be used.

RFID is the process by which items are uniquely identified using radio waves, and NFC is a specialized subset within the family of RFID technology. Specifically, NFC is a branch of High-Frequency (HF) RFID, and both operate at the 13.56 MHz frequency ATM Identifying the User The user starts a session on the atm, by identifying themselves to the atm. The identified user's account is opened and displayed, on the display.

A login screen is displayed on the display. The login screen has a window for the user to type their account number, and another window to type in their password or pin number.

The user can also login, with a combination of ways to identify themselves to the atm, and or pin, or by identifying themselves.

The user identifies themselves to the atm, by using, either a debit card, or credit card, inserted into a machine card reader. The atm can identify using facial recognition, of the user's face, viewed by an atm camera connected to the atm computer, positioned to view the user's face. A facial recognition software is in the ATM computer.

A microphone is part of the phone and connected to the phone computer, or an atm microphone is part of the atm, and connected to the atm computer. The atm has voice recognition software, or the atm has atm voice recognition software. A finger print reader is connected to the atm, with either device having finger print recognition software. A radio frequency identification card is part of the phone, and a radio frequency identification card reader is part of the atm. A software digital wallet is part of the phone and includes the user ATM account information.

Control Panel Menu Instructions

The control panel displays inputs, commands, Instructions that can be hand gesture activated, including, deposit, withdrawal, checking, savings, credit, a 1-10 number pad, numbers 1, 2, 3, 4, 5, 6, 7, 8, 9, 0, log in, log out, withdrawal 20, 40, 100, enter, change, and cancel, etc. The activated commands can display, and or active different pages on the display, that are associated to the commands, like, activating will display the deposit page.

Automatic Teller Machine Operation

The user identifies themselves to the ATM. The user is in view of the display. The hand tracker views the user's hands and determines the point, that the user is gesturing at on the display.

The user views the one or more menu items that are displayed on the display screen. The user chooses one of the menu icons that they want to active.

The displayed cursor follows the user's hand as it moves in midair. The user's hand has virtual connection to the cursor. The item that is contacted by the cursor at is highlighted.

The hand tracker detects the user's gesture at the display. The point where the user gestures on the display, and where the cursor is positioned, is the user's gesture point. The user gestures at the menu icon that they want to active. The user gesture at the highlighted item, and the item is left clicked, or activated. The user can choose another item to activate.

The cursor follows the user's finger in midair, on the display. The finger moves the cursor to the menu icon, that they want to active. The cursor moves to the item, that is gestured at. The cursor touches the item, or is superimposed or over lays the item, with the cursor being visible on top of the displayed item.

The user gesture at the highlighted item, And the item is clicked, or activated. The user can choose another item to activate.

The user gestures at the ATM display. The hand tracker detects the user's gesture. The display asks for the user's personal identification number pin. A number ten key number pad, and or key board is displayed.

The user gestures at the number that the user wants to input, such as, a number 2. The number 2 is highlighted, or the cursor moves to the number 2. The gesture at the number is continued, and the number 2 is activated. The activated number forms part of the pin number.

The user inputs numbers until the pin number is complete. The user gestures at a displayed enter input icon, until it activates. The enter input icon inputs the pin number. The user's account information is displayed.

The User can Activate Different ATM Services

The user can activate different ATM services, by gesturing at icons displaying, and associated to a checking account balance, a savings account balance, a credit card account balance. The user can deposit funds, or withdraw funds from the different accounts, using gesture at inputs associated to the accounts, shown on the display.

The gesture is directed to the checking account balance. The checking account details are displayed. The gesture is directed at a checking account balance, and a withdrawal amount icon. Withdraw amounts are displayed, such as, 20, 40, 100, 200. The user can activate with gesture, one of the displayed amounts. To enter a different amount, the gesture is directed to a different amount.

The ten keypad is displayed, of inputting the different amount. The user gestures at each number, to input each number, such as, the 2 number, and the 0 number, that makes up the amount the user would like to withdraw, such as, a 20.00 amount. The user gestures at the enter icon. The withdrawal amount is entered, by activating the enter icon. The ATM dispenses the 20.00 amount.

The user is asked on the display, if the user would like another request. The user gestures at a cancel input icon, and the interaction is complete, and the user is signed out of their account.

The cursor contacts a withdrawal icon on the display. The withdrawal icon is highlighted. The user moves their finger up and down quickly, or by putting thumb and index finger together, and the withdrawal icon is left clicked, and activated. The activated withdrawal icon is associated, to activating a withdrawal function of the ATM.

Cursor Following Finger

The cursor is displayed with the input icons. The cursor follows one of the user's fingers. The cursor is perpendicular to the finger on the display. The finger moves the cursor to an icon. The one of the fingers touches the thumb, or is moved up or down quickly, to left click, and activate, the icon, contacted by the cursor.

The camera is connected to the display computer. The camera is part of the display. The camera views the user's fingers.

Examples of Operating the ATM

The user inputs the deposit input, using hand gestures. The deposit screen is displayed. The user hand gesture inputs 10 dollars, by uses cursor finger following and hand gestures with their finger, at the numbers 1 and 0 on the number pad consecutively. The fingers gestures activate the enter input. The 10 dollars of currency is deposited, and accepted by the atm, and the accepted deposit is displayed by the display. The user ends the session with the ATM, by using hand gestures, to activate the log out input.

Hand Tracker Display for a Device Operated in a Flammable Environment Description A hand tracker display is used to view a finger, and input, input icons in a flammable environment. The display eliminating electric discharge from a user's finger from touch inputting on a physical touch input surface. Electric discharge might ignite airborne flammable particles.

An on off switch associated to displayed icons, is operated in the flammable environment. Operation of the switch, deceases the chance of a static electric spark from being created when the finger touch's an input surface, such as, when the user's finger contacts an on off switch's physical input surface.

Electric discharge from the user's finger to a surface input button, is eliminated by gesture inputting into one the icons. The chance of flammable vapor or particles igniting in the flammable environment, is decreased, by decreasing the chance of a static electric spark.

Icons associated to an operation of the device, may include, a variety of different icons, or icon inputs, such as, numbers or letters, and device commands for inputting into the device, by using gesture.

The display may be used in flammable environments that can include, grain elevators with grain dust, petroleum refineries, hydrocarbon carrying oil tankers and space stations, where static electric may be a problem, caused by the dry air environment. Devices in the environments, include, a gas compressor, a ventilation device, communication devices, virtual computer keyboard and a fire extinguisher system.

Cursor Following Finger

A cursor is displayed with the input icons. The cursor follows one of the user's fingers. The cursor is perpendicular to the finger on the display. The finger moves the cursor to an icon. The finger is moved up or down quickly, to left click, and activate, the icon, contacted by the cursor.

The camera is connected to the display computer. The camera is part of the display. The camera views the user's fingers.

Hand Tracker Display for a Device Operated in a Flammable Environment Operation

The user views the different icon inputs. Each button is associated to a selection of one of a variety of device operations. The user chooses an icon or combination of different icons to input, and to select the desired device operation. The user activates the desire input icons, by using gesture.

The activated buttons instructions, for the operation of the device, in the flammable environment, are sent to the device. Operations of the device, may include, the turning on or off, of the device. The device may be an elevator. The elevator call button up or down is displayed in mid-air. Gesture activates the up button. The elevator stops on the user's floor.

The user can access information, in a flammable room environment. The user types in a display connected to a computer, a name, by using cursor finger following and hand gestures at a virtual qwerty key board. The user uses cursor finger following and hand gestures at the space key, a space is made between letters, and or words. The search results are displayed.

Operating Room Patient Information Access Computer Description and Operation

A health care worker can access a user's information, in an operating room environment. The user types in a display connected to a computer, a user's, name by using cursor finger following and hand gestures at a virtual qwerty key board. The user gestures at the space key, a space is made between letters, and or words.

Cursor Following Finger

A cursor is displayed with the input icons. The cursor follows one of the user's fingers. The cursor is perpendicular to the finger on the display. The finger moves the cursor to an icon. The finger gestures by touching the thumb, or is moved up or down quickly, to left click, and activate, the icon, contacted by the cursor.

Dust Free Environment Description and Operation

On Off Switch

A hand tracker display is connected to a semiconductor production machine. The machine is in a dust free environment. A user's gesture can activate a displayed on off switch, or enter input, for semiconductor production machine, by gesturing at either the on switch, or the off switch. The activation of the on switch turns the machine on, and the activation of the off switch turns the machine off. A user's gesture can activate a displayed enter input icon. The enter input icon activates a gesture highlighted input icon on the display Other machines can use a hand tracker display, with on off switches, or an enter input icon, such as, a microchip production area, a satellite production area, a biomedical, or a pharmaceutical medicine production machine.

The touch free hand tracker display, lessens the production of dust that may be created by operating a touch key board.

Cursor Following Finger

A cursor is displayed with the input icons. The cursor follows one of the user's fingers. The cursor is perpendicular to the finger on the display. The finger moves the cursor to an icon. The finger is moved up or down quickly, to left click, and activate, the icon, contacted by the cursor.

The user can access information, in the dust free environment room environment. The user types in a display connected to a computer, a name, by using cursor finger following and hand gestures at a virtual qwerty key board. The user uses cursor finger following and hand gestures at the space key, a space is made between letters, and or words. The search results are displayed.

A Hand Tracker Public Information Kiosk Description and Operation

A hand tracker display is connected to a public information kiosk. The kiosk is in a public environment. A user's gesture can highlight and activate, a displayed enter input icon. The enter input icon is activated, by a continued gesture, after the icon is highlighted, on the display.

Cursor Following Finger

A cursor is displayed with the input icons. The cursor follows one of the user's fingers. The cursor is perpendicular to the finger on the display. The finger moves the cursor to an icon. The finger is moved up or down quickly, to left click, and activate, the icon, contacted by the cursor.

The user can access information, on the kiosk. The user types in a display connected to a computer, a name, by using cursor finger following and hand gestures at a virtual qwerty key board. The user uses cursor finger following and hand gestures at the space key, a space is made between letters, and or words. The search results are displayed.

Finger Tracker Input Self Driving Car Description

A car control panel display, and finger, or hand trackers are positioned inside of a self-driving car, self-driving vehicle, car that drives itself. The finger tracker views a user's fingers, when they positioned in front of the display, when the user is inside the car. The finger tracker, radar sensor, allows the user, to use hand gestures, finger gestures, finger following, to activate input icons, displayed on the display.

The self-driving vehicle, can be a car, bus, tractor trailer, airplane, ambulance, motor cycle, boat, subway train, space ship, train, mini bus, or taxi, a ride-hailing, peer-to-peer ridesharing, taxi cab hailing, food delivery, and bicycle-sharing.

Finger Icon Activation Steps, Finger Moving a Displayed Cursor

The finger tracker detects where the user's finger, fingers, or hand are viewable. A cursor on the display, is associated to the location of the finger in midair, in relationship to the display. The cursor follows the movement of the finger, in mid-air. The finger can be perpendicular, or at an angle to the display, for the cursor to follow it. The user controls the location of the cursor, with movement of their finger.

The finger moves the cursor, to an input icon to activate the icon. The finger tracker detects when the user's finger position, is in front of one of the icons.

The user's finger is position in front, or near an enter input icon. The positioned finger, moves the cursor to contact the enter icon. Contact of the cursor to the icon, highlights the icon.

Finger Activation of Icon

When the cursor contacts the enter icon, and the icon is highlighted. The user uses a finger gesture, in midair, such as, by putting thumb and index finger together, or extending their finger, moving their finger up and down, or moving their finger side to side, to activate the enter command, contacted by the cursor.

The up and down finger gesture is made, and the enter input is activated. The activated enter input is used, to enter an input, for the car.

Additional gestures can be used, to activate an icon. The computer is programmed with hand, and finger gesture recognition software, for detecting the finger's, or hand's gestures. The user's hands, can use the same gestures, as the finger to active an icon, such as, up and down movement, or by putting thumb and index finger together.

A Signal that the Icon has Activated

A signal that the icon has activated, is sent to the car, to operate a function of the car. The car receives the signal, to operate, influence the function of the car. The car uses the received function signal, to operate the car.

The display receives, and displays feedback, from the computer in the display, concerning the influence the activated computer function, has had on the display computer.

The display receives, and displays feedback, from the computer in the car, concerning the influence the activated car function, has had on the car A Map for Choosing Destinations The display shows, car input buttons, such as, start car, stop car, a displayed interactive internet GPS map, air fan speed increase, or decrease button, heat temperature thermostat increase, or decrease temperature button.

The map is used for the user, to request the car travel, to a chosen destination on the map. The map can be display in 3D. The input icons, can be displayed two dimensionally 2D, or three dimensionally 3D.

The user can zoom into and out of the map. The map is a graphic representation of the area, with written descriptions, such as, streets, street names, buildings, names of points of interest, like, parks, stores, restaurants, metro stations. The map can be a picture view, such as, a street view of the locations.

The display computer's location can be found using the display's global positioning system GPS, or display cell phone location. The map includes the car's locations on the map.

Finger Tracker and Device Connections

The display connects to a finger tracker computer. The finger computer connects to a car computer. The finger computer has, finger computer operating software, and finger tracker operating software. The finger computer operates, the display and operates the finger tracker. The finger computer uses artificial intelligence software.

The car computer connects to the car. The car computer has car operating software. The car computer operates the car, or connects to other computers in the car, that operate the car. The car computer has car operating software, and the car computer has car operating software. A wireless, or wired connection, may be between, connect the devices, finger gesture tracker, display, and computers.

Monitoring Multiple Users

The computer can monitor multiple users with the finger tracker. Multiple finger trackers, can be connected to the computer. The computer can monitor multiple users, by using multiple finger trackers.

The display can have more than one finger tracker. More than one display, with a finger tracker, can be positioned in the interior of the car, and be connected to the computer. the computer can connect to a central computer, cloud computing, which is connected to the car computer.

Two or more users can input into the display, at the same time. Two or more cursors can be operated on the display. Two or more of the displayed inputs, can be highlighted at the same time.

Each user is assigned a different cursor, such as, a different cursor shape or color, for the users to know which cursor is associated to their finger.

The Car's Devices

The car's devices can include, radio, climate control temperature, head lights, interior lights, ignition on or off, air fan speed, air venting defrost or feet warming, movies, computer games, social media web sites, engine temperature, oil warning light, and seat belt disconnected warning.

The display can display a speedometer, to show car speed. The display shows, amount of fuel indicator, electric power battery percentage, or gasoline amount, climate control, air conditioning, and heat settings. The display can be projected on the windshield, as a head up display.

A wireless internet connection to the car computer is used to, surf the internet with a web browser, check the weather, watch movies on demand by movies services, interact with social media, and video chat.

The graphical interface includes car device components commands, such as, radio station search, pre-set radio stations, increase or decrease radio volume, heat increase or decrease, fan speed increase or decrease, windshield wipers on, wiper speed increase or decrease, displaying a global positioning system GPS map, headlights on, and headlight low or high beam. All the devices listed, have a displayed on off switch, either the off or on function of the switch, can be activated by finger following, and gestures.

The radio interface includes, a graphic number station indicator, a sound volume indictor, a switch to another device switch, sound volume increases or decrease holograms, and radio station change station increase or decrease holograms.

The vehicle is equipped with computers, that are connected to the car's computer, including, pedestrian or vehicle detection sensors, radar, and vehicle cameras and sensors (not shown).

Car instruments can be displayed, such as, speedometer, engine revolutions, engine oil pressure, engine oil alert, engine temperature, and engine temperature alert, and check engine lights.

Displays Connection to Internet

The display can connect to the internet. The display's or car computer connects to a cell phone tower, using radio wave transmitters, and receivers. The tower connects to an internet router for the tower. The tower router connects to a web server for the tower. The tower web server connects to the internet.

The Icons Can Operate Different Functions,

The icons can operate different computer functions, such as, an internet operation, a car operation, or a computer operation. A browser input icon is used in internet operations, to display a search web page.

Input icons are displayed on the displayed web page, such as, an internet search operation. The search operation, is used to search the internet. The user types into the search operation, information requested by the user, and activates the search operation. The results of the search are displayed.

The icons show computer functions, such as, an center input, or command. The icons show car functions, such as, a light on icon, which is used as part of the car.

A Tool Bar to Associate Functions to Finger Gestures, Like Left Click

A tool bar is displayed, that has commands that can be associated, to finger gestures. The commands include, right click, left click, double left click, scroll, zoom, keyboard select.

Associating the Left Click Command to Finger Gestures

A command associated to what a finger gesture operates, when the user finger gestures at an icon, such as, the user associates the left click command to a finger gesture, so that when the finger gesture is directed an icon, the icon is left clicked.

The left click command can be sticky, on continuously for the finger gestures, or a one-time left click.

With one-time left click, the left click command is activated, for one use, of the finger gesture associated to the left click command. The activation of the one-time use left click, and left click command are graphically displayed on the tool bar.

To have continuous left click operation, the continuous left click operation is associated to the finger gestures, like, by putting thumb and index finger together. The activation of the continuous left click operation, is graphically displayed.

Operation of Left Click Command

With continuous left click operation, input icons that the user finger gestures are left clicked. This activation method is the same for right click, double left click, and zoom, being associated to the finger gestures.

The finger gestures to active an icon, can be changed by the user, such as, the finger gestures can be changed from waving to making a fist, to active the icon.

The detection of finger gestures, activates a graphical representation next to the cursor, to inform that the finger gesture is detected.

Sending the Device, the Activated Device Function

A signal that the icon has activated, is sent to the car, to operate a function of the car. The car receives the signal to operate the function of the car. The car uses the received function signal, to operate the car.

The display receives, and displays feedback, from the computer in the display, concerning the influence the activated computer function, has had on the display computer.

The display receives, and displays feedback, from the car computer in the car, concerning the influence the activated car function has had on the car.

Programming

In addition, for the method and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive A software flowchart, shows operational steps of finger gestures, used to operate the self-driving car, which include, cursor finger following and hand gestures at map detected, the detected finger gestures creates displayed destination location on map, detected finger gestures at directions to destination icon, activates directions to destination icon from present location icon, activated directions to destination icon, displays multiple routes to destination from present location icon, detected finger gestures at one of the desired routes, activates desired route, detected finger gestures at start to destination icon, activates start to destination icon, activated start to destination icon, activates requested for car to proceed to location of destination icon, car starts proceeding to icon location destination, and car's moving location updated on map.

Storage

Computer program instructions may also be stored in a computer-readable medium that can direct a computer or other programmable data processing apparatus, to function in a manner, such that the instructions stored in the computer-readable medium produce a function of a device, including instructions which implement the function act specified in the flowchart and or block diagram block or blocks.

The computer program instructions may also be loaded onto a computer or other programmable data processing apparatus, to cause a series of operational steps to be performed on the computer, or other programmable apparatus to produce a computer implemented process, such that, the instructions which execute on the computer, or other programmable apparatus provide processes, for implementing the functions or acts specified, in the flowchart and or block diagram block or blocks.

Block Diagram of Connected Components

A block diagram of the connections, between the hardware components, of the finger gesture tracker in the self-driving car, which includes, finger gestures tracker, display, finger gestures tracker computer with finger gestures tracker software, self-driving car computer.

Menu Help Instructions

A help icon labelled help, can be displayed, that the user moves the cursor to the icon and hand gestures, activated displays instructions on how to operate, the hand gesture device system, such as, explaining how to move the cursor to the icon and hand gesture a device's icon to display the car control panel, which displays its different car operations or car items which are hand gesture activatable.

Finger Gesture Tracker Self Driving Car Operation

Requesting the Car Move to a Location

The GPS internet map shows the user's present location, on the displayed map. present location can be shown by a symbol, such as, a circle.

The Map

Finger gestures is used to input a destination location on the map, that the user wants the car to move to. The user finger gestures, and the finger gestures creates a point on the map, or inputs the location, on the map, that the user wants the car to move to.

The move to location, is highlighted with a visual, clue, such as a dot, a flag, on the displayed map. The use can move, the move to location dot to another location, by grabbing the dot with the cursor, and having the dot follow the cursor to the other location. The user can input multiple routes, that are followed consecutively by the car, by inputting a second destination.

Searching for a Location, or Address

The map has a search icon 548, The activated search icon opens a search window, and displayed keyboard. In the search window is typed building addresses, names of businesses, names of locations, streets, street names, buildings, names of points of interest, like, parks, stores, restaurants, metro stations, city names, and hospitals. The map can be a picture view, such as, a street view of the locations.

The found locations are displayed on the map. Each of the displayed devices icons has a description associated to the icon, each description describes the icon that it is associated to, like, a 6-passenger car, atm, smart toilet, or gas pump open from 9 am to 10 pm.

Choosing a Route

The user is shown one or more routes, to the desired location. The user finger gestures at the desired route, the desired route is chosen. The displayed chosen route is highlighted. A start travel icon is displayed. The user finger gestures at a start travel icon, and the car starts travelling the route. A stop travel icon is displayed. The user finger gestures at the stop travel icon, and the car parks safety out of the way of traffic.

An activated voice icon announces the car's location, as it travels. A compass icon points to the north.

Operating the Car's Devices

The user can increase the volume of the radio, connected to the computer, by finger gesturing, at the increase icon 520, to left click the increase icon. Finger gestures activates a decrease volume icon symbol 522 of the radio, which decreases the radios volume. The user can view the volume of the radio, on the volume indicator icon.

The user can view a number icon of the radio station the radio is tuned to. The user can change the station, by finger gesturing at the radio station change station, increase or decrease icon. The user can switch between the radio receiving amplitude modulation AM, and frequency modulation FM radio waves, by finger gesturing at the change car component symbol icon 512.

The user can turn on the head lights, by finger gesturing at the turn on head lights icon (not shown). The user's finger gesturing, with the light icon is detected by the finger gesture camera, or and hand gesture radar, with hand gesture software connected computer. The computer activates the turn headlight on function. The computer sends instructions, to the headlights switch to turn on the headlights. The light switch is switched to the on position, in the on position, the lights are turned on.

Driving Safety

If a pedestrian, or vehicle is detected to close to the car, or on a course where the pedestrian, or vehicle may contact the car, the pedestrian is highlighted on the display. The pedestrian, or vehicle is viewable by a red flashing outline, halo around the pedestrian.

The highlighting allows the driver, to act to avoid possible contact, with the pedestrian or vehicle. The user finger gestures at the, stop car icon, and stops the car, in an emergency.

Displayed Safety Input Icons

The pedestrian or vehicle is detected by sensors, radar, pedestrian or vehicle cameras and sensors in the car (not show), which are connected to the computer. The turn off the car icon, is shown, which turns off the car, if the user feels it's safer for the car to be turned off, such as, if smoke is coming from the car engine compartment.

An evasive safety maneuver icon, is shown for the car to take evasive maneuvers. The user uses the, evasive maneuver icon, when the user thinks the car could be driving more safely, or to avoid an obstacle.

Activation of the evasive maneuver icon, may slow the car down, and increase the ability of the sensors, and computer, to take driving measurements, which may enhance driving safety.

The user can be altered to take control of the car, and drive the car if there's a malfunction, such as, a problem, with the car computer, or with the car.

2nd Embodiment Self Driving Finger Tracker Input Car Description

Finding a Self-Driving Car by Viewing the Self-Driving Car's Location on a Map

The user can find a car that drives itself, self-driving car's, location, on a displayed map, on a phone, a laptop display, or a tablet display computer. The phone can be placed on the car dash board.

The phone has a global positioning system GPS, and the car has a GPS. The position of the phone, and car plotted on a map on the server, such as, an internet map. The map determines the distance from the phone, to the car.

The user finds the car, by viewing the car's, and phone's location on the map. The map can be an internet map which shows streets, and buildings, and environmental information. The user can move to the car, and view the phone icon's location moving, in real time on the map. The user can view their progress toward the car, as the map updates the phone's location on the map. Each of the car icons has a description associated to the icon, each description describes the icon that it is associated to, like, a 5-passenger car.

The cursor and hand gestures screen has a route software, which augments the map, by showing a line, that is displayed on the map environment, and viewable by the user. The line is followed to reach the device. The route is pinned to the map environment, as the user walks, or cycles a bicycle, motorcycle, or rides in another self-driving car.

The route in the environment, is the same as the map route, and follows the route, that is displayed on the map. The user can follow the route line to reach the car's destination.

After Finding the Car

The user unlocks the car door, using the by transmitting the user's identify information to the car, and personal identification number, or password. The user cursor and hand gestures the car icon which opens a door unlock screen.

Outside radar sensors, located on the outside of the car, detects when the user's fingers are 0.1 to 3 meters from the driver or passenger window. The detection of the fingers activates a displaying of a control panel to open the doors to the car. The screen is displayed, projected on the car's driver or passenger window, the window display is connected to the computer. The outside radar sensor connected to the computer and is positioned, to view the user's hand when the hands are near the outside of the window.

The user is asked on the screen for their pin number. A qwerty keyboard is partially displayed on the door unlock screen control panel. The user is asked for a pin number (personal identification number) to unlock the doors. The user cursor and hand gestures each number of the pin into a pin window, in this case the user's pin is 7314.

The user activates a displayed enter command when the pin is in the window, and correct pin unlocks the door. The user opens the car door, the user enters the car.

The user moves a cursor that that follows their finger, when the finger is in midair. The cursor overlaps the displayed ten key pad or qwerty keyboard. The cursor is moved to the desired number. The user puts their thumb and index finger together in view, which is detected by the radar sensor, the detected finger gestures activate the number the cursor is contacting. The ten key pad has numbers from 0 to 9, the qwerty keyboard has number, and letters, like, a, b, c, d, e, or 1, 2, 3, 4, 5 etc. For example, the user moves the cursor to the number 7 displayed on the window, and thumb and finger touch gesture left clicks, activates the number 7. The activated 7 is put in the pin window. The user puts in the rest of the pin numbers. When the 7314 numbers are in the pin window, the user activates the displayed enter command, with cursor finger following and finger gesture. The correct pin number is entered and verified by the computer. The correct verified pin unlocks the door. The pin can also be letters, symbols, and different lengths, like, 5 letters and symbols long. Using the displayed pin display, allows for the user to avoid touching a physical number pad which may have dirt on it, to unlock the door.

When the user is, inside the car, the user unlocks the cars locked ignition, by transmitting the user's identify information to the car, and personal identification number, or password. The user cursor and hand gestures the car icon which opens a screen.

The user is asked on the screen for their pin number. A keyboard is partially displayed on the unlock screen, the user cursor and hand gestures each number of the pin into the pin, in this case the user's pin is 7314. starts the car. The user wants to go to a vending machine.

A control panel is displayed, by a phone's cursor and hand gesture screen. The control panel shows different operations of the car. Each operation is activated by cursor and hand gestures of the operation. Each operation describes a different operation of the car. The activated operation activates the operation of the car that the activated operation of the describes. The activated the operation of the car, influences the operation of the car. The influenced operation of the car is shown on the display.

The user cursor and hand gestures 0.2 to 1.6 meters from the display, while a radar sensor positioned to view their hands. The display and user are inside of the car. The hand system is the portable computer, with the display, and hand gesture radar, and hand gesture software. The hand gesture screen detects a user's fingers, uses cursor finger following and hand gestures near the display.

The display shows, car input buttons, such as, start car, stop car, a fan speed increase, or decrease, a heat temperature thermostat increase or decrease temperature, and an interactive internet map. Radio on or off, frequency modulation.

The computer connects to a global positioning system GPS device, in the phone. The map knowns the phones location. The map is used, for the user to request the car travel, to a chosen destination on the map. The map displays the cars location with a car icon on the map. The map can be used to find the car, by using the map to follow a route to the car.

The car computer has car operating software, and radar cursor and hand gestures operating software. The computer operates the car or connects to other car computers that operate the car, operates the display, and operates the radar.

The car computer connects to an internet, with the car connected to the internet. The computer operates the car, the display, and the hand gesture screen.

A Displayed Map

A map is part of the display, with the location of the car, and device's locations shown on it. The map is displayed on the display, with the locations, of the phone, and car. The map displays the relationship of the location of the devices to the car, and distance between them.

The car control panel is displayed by the display. The user operates the car, by cursor and hand gestures inputting into the car's displayed control panel. The inputs into the car control panel, are sent to the car. The car uses the received inputs into its control panel, to effect, influence the operation of the car. The influenced operation of the car is sent to the display. The display displays the influenced operation of the car.

Car's Devices

The car's devices can include, a radio, climate control temperature, head lights, interior lights, ignition on or off, air fan speed, air venting defrost or feet warming, movies for passengers, computer games for passengers, engine temperature, oil warning light, and seat belt off warning.

The interface includes car device components commands, such as, radio station search, pre-set radio stations, increase or decrease radio volume, heat increase or decrease, fan speed increase or decrease, windshield wipers on, wiper speed increase or decrease, internet map, headlights on, and headlight low or high beam.

The radio icon interface includes, a graphic number station indicator a sound volume indictor a switch to another device switch, sound volume increases or decrease icons, and radio station change station increase or decrease icons.

The vehicle is equipped with, and connected to the car's computer, pedestrian or vehicle detection sensors, radar, and vehicle cameras and sensors (not shown).

Car instruments can be displayed by icons, such as, speedometer, engine revolutions, engine oil alert, and engine temperature alert.

The radio icon interface includes, a graphic number station indicator, a sound volume indictor a switch to another device switch, sound volume increases or decrease icons, and radio station change station increase or decrease icons.

The car has software operating instructions icons, for the various functions and devices of the car. The car instructions are displayed on a menu by the cursor and hand gestures screen.

The menu is on the hand gesture screen. The car's devices can include, radio, climate control temperature, head lights, interior lights, ignition on or off, air fan speed, air venting defrost or feet warming, movies for passengers, computer games for passengers, engine temperature, oil warning light, and seat belt off warning.

One icon displays an increase symbol, a second icon displays a decrease symbol, and a third icon displays a, toggle, or change car component symbol.

The car hand gesture screen shows a user interface. The display can be placed above the car dash board, and within cursor and hand gestures distance of driver or passenger. The interface includes car device components commands, such as, radio station search, pre-set radio stations, increase or decrease radio volume, heat increase or decrease, fan speed increase or decrease, windshield wipers on, wiper speed increase or decrease, ground positioning system map, headlights on, and headlight low or high beam.

Internet Connection

The computer connects to the internet, thru a wireless connection to cell phone towers, or satellites, or wifi. The computer had a cell phone tower radio wave receiver and transmitter.

While the car is driving to a destination, or turn on, the user can surf the internet on the cursor and hand gesture display, view internet web pages, stream and watch movies, videos, tv, listen to music, internet radio, and play online internet games.

Car instruments can be displayed by icons, such as, speedometer, engine revolutions, engine oil alert, and engine temperature alert. The radio icon hand gesture interface includes, a graphic number station indicator, a sound volume indictor a switch to another device switch, sound volume increases or decrease icons, and radio station change station increase or decrease icons.

The vehicle is equipped with, and connected to the car's computer, pedestrian or vehicle detection sensors, radar, and vehicle cameras and sensors (not shown).

User Finds a Car by Using a Map

The user can find a car's location, on the map. The car has software operating instructions icons, for the various functions and devices of the car. The car instructions are displayed on a menu by the hand gesture screen.

The menu is on the car screen. The car's devices can include, radio, climate control temperature, head lights, interior lights, ignition on or off, air fan speed, air venting defrost or feet warming, movies for passengers, computer games for passengers, engine temperature, oil warning light, and seat belt off warning.

One icon displays an increase symbol, a second icon displays a decrease symbol, and a third icon displays a, toggle, or change car component symbol.

The display screen shows a user interface above the car dash board, and within distance of driver or passenger. Multiple displays can be displayed in the car, connected to the computer, be cursor and hand gesture interactive, and operate with many users inputting hand gestures at the same time.

The interface includes car device components commands, such as, radio station search, pre-set radio stations, increase or decrease radio volume, heat increase or decrease, fan speed increase or decrease, windshield wipers on, wiper speed increase or decrease, ground positioning system map, headlights on, and headlight low or high beam.

Car instruments can be displayed by icons, such as, speedometer, engine revolutions, engine oil alert, and engine temperature alert.

The radio icon interface includes, a graphic number station indicator, a sound volume indictor a switch to another device switch, sound volume increases or decrease icons, and radio station change station increase or decrease icons.

The vehicle is equipped with, and connected to the car's computer, pedestrian or vehicle detection sensors, radar, and vehicle cameras and sensors (not shown).

A Software and Hardware Flow Chart

A software and hardware flow chart, includes, a display is connected to a computer, a hand gesture sensor is connected to the computer, the computer has a hand gesture software, the hand gesture sensor is positioned to view a user's fingers, the computer is connected to a self-driving car, operations of the self-driving car are displayed on the display, the displayed operations describe operations of the self-driving car, an avatar is displayed on the display, the avatar overlaps the displayed operations of the self-driving car, the computer is configured to associate the detected hand movement in mid-air to movement of the cursor on the display, the computer is configured to detect a hand gesture of the finger, the computer is configured to have the detected finger gesture activate the displayed operation of the self-driving car that the avatar is over lapping, activation of one of the displayed operations is associated to activating an operation of the self-driving car that is described by the displayed operation, the activated operation of the self-driving car effect's the operation of the self-driving car, the effected operation of the self-driving car is sent from the self-driving car to the display, the received effected operation of the self-driving car is displayed on the display.

A Software Flow Chart

A software flow chart, includes, displaying operations of a self-driving car that are different from each other on a display, displaying an avatar on the display, detecting a user's hand movement in midair, moving the avatar in relationship to a detected movement of a user's hand, contacting the displayed operations with the avatar, detecting a hand gesture of the user in midair, activating the displayed operation contacted by the avatar by the detected user's hand gesture, sending the activated operation to the self-driving car, influencing the operation of the self-driving car with the received activated operation, sending a description of the influenced operation of the self-driving car to the phone.

Car Lights Turn on Automatically

The self-driving car's lights turn on automatically, due to low light conditions. A light sensor is positioned to detect daylight outside of the car, is connected to the computer. The light sensor detects when it is day time or night time. Detection of night time, is associated to activating the turning on of the car's headlights, and parking lights. Detection of day time, is associated to activating the turning off, or not turning on of the car's headlights, and parking lights. The computer has an automatic light software, that analyzes whether the light sensor detects day time or night and signals the lights to turn on at night or off if daytime.

2nd Embodiment Self Driving Car Finger Tracker Input Operation

The display has a holographic control panel input display, or two-dimensional display. The map shows the user's present location on the map. The present location is shown by a figure, such as, a circle.

The user cursor and hand gestures to move the cursor a point on the map with, and hand gestures to click the cursor, this creates a displayed location, icon, on the displayed map, that the user wants the car to move to. The move to location is highlighted with a visual, clue, such as, a dot, a flag, or a cursor point on the display. The user can move the dot to another location, by activating the dot to follow, the cursor and hand gestures to the other location.

The map has a search icon. The activate search icon opens a search window. In the search window, is typed building addresses, names of business, names of locations. The found locations are displayed on the map.

The user can type in a start location, and a destination location, and different routes will be shown between the two locations. The user is shown one or more routes, to the desired location. The user cursor and hand gestures the route the user desires. The displayed chosen route 1136 is highlighted. A start travel icon 1 is displayed. The user cursor and hand gestures a start travel icon, and the car operation starts travelling the route. A stop travel icon is displayed. The user cursor and hand gestures at the stop travel icon, and the car parks safety out of the way of traffic. A voice icon announces the phones location. A compass icon points to the north.

The display has a cursor and hand gestures screen display. The user can hand gesture input, the displayed input icons for the self-driving car, by cursor and hand gestures the icons on the screen. The user cursor and hand gestures the start to destination icon, to activate the start to destination icon. The activated start to destination icon, signals the car's computer, to proceed to the location of the destination icon.

If a pedestrian or vehicle is detected to close to the car, or on a course where the pedestrian or vehicle may contact the car, the pedestrian is highland on the display. The car automatically avoids contact with the pedestrian, object, or other car, by either stopping the car, or moving the car out of the way of the hazard. Hazard advance software is part of the car computer and uses artificial intelligence software to aid in hazard avoidance. The intelligence software learns to improve the cars obstacle avoidance as the car is operated over a time period.

If the computer doesn't avoid the hazard, the user may manually avoid it. The pedestrian or vehicle is viewable with a red flashing outline, halo around the pedestrian. The highlighting allows the driver, to act to avoid possible contact, with the pedestrian or vehicle. The user can cursor and hand gestures at the stop car icon to turn off the car in an emergency. The pedestrian or vehicle is detected by sensors, radar, pedestrian or vehicle cameras and sensors in the car (not show), which are connected to the computer.

The user can increase the volume of the radio, connected to the computer, by cursor and hand gestures the volume increase operation icon, or decrease volume symbol of the radio by cursor and hand gestures the decrease volume symbol icon. The can view the volume of the radio on the volume indicator icon. The user can view a number icon of the radio station the radio is tuned to. The user can change the station, by cursor and hand gestures to the radio station change station increase or decrease icon. The user can switch between the radio receiving amplitude modulation AM, and frequency modulation FM radio waves, by cursor and hand gestures to the change car component symbol icon.

The user can turn on the head lights by cursor and hand gestures the turn on head lights icon (not shown). The cursor's contact with the light icon, and hand gesture is detected by the hand gesture screen and sent, to the connected computer. The computer activates the turn headlight on function. The computer sends instructions to the headlights to switch to turn on the headlights. The light switch is switched to the on position, the lights are turned on.

The user can turn on the head lights by cursor and hand gestures, to turn on head lights (not shown) with their finger. The user's finger cursor and hand gestures contact with the light icon is detected by the hand gesture screen, and the connected computer. The computer activates the turn headlight on function. The computer sends instructions to the headlights switch to turn on the headlights. The light switch is switched to the on position, the lights are turned on.

The menu in the control panel is at a location which the user uses to move the cursor to the icon, and accessible by the user when the user is near dashboard, such as, 0.1 to 2.6 meters in front of the user's hands. The user cursor finger following and hand gestures to move the cursor to the icon, and activate the different input commands for the car, such as, turn on or turn off lights.

The user uses move the cursor to the icon and the command they want to highlight, and activate, to highlight the command they want activated. The user uses their cursor and hand gestures to activate the command they want activated.

The user cursor and hand gestures with their fingers at the command they want to activate, the command is clicked, by the cursor and hand gestures and the command is activated. The user can active another command after the first command is activated. The user can active another command after the first command is activated.

The user can change the location that the input display is positioned. The display location can be a location which is convenient for the user.

When a car icon is activated, the car transmits to the computer, that the icon is activated. The car sends data about the status of the activated device, such as, speed of the car. The data sent from the car is displayed on the on the screen display. The displayed data keep the user informed about the car's operation, and interaction with the user. The user can use the displayed car data to adjust the operation of the car, such as, changing the speed of the car.

If a pedestrian or vehicle is detected to close to the car, or on a course where the pedestrian or vehicle may contact the car, the pedestrian is highland on the phone's screen or displays screen. The pedestrian or vehicle is viewable with a red flashing outline, halo around the pedestrian. The highlighting allows the driver, to act to avoid possible contact, with the pedestrian or vehicle, by stopping the car or maneuvering the car out of the way. The pedestrian or vehicle is detected by sensors, radar, pedestrian or vehicle cameras and sensors in the car (not show).

Cursor and hand gestures input of one of the icons, by the user's finger, inputs a request to the computer. The computer directs the car to carry out the input request of the user. For example, the user cursor and hand gestures enter an input icon. The enter input is detected by the sensor and the computer. The computer directs the car use the light's high beams.

The input of one of the icons inputs the action, or command associated to the icon. The user uses move the cursor to the icon and the input area associated with the icon, when they hand gesture at the icon. The computer receives the input, and activates the function associated to the input. The device associated to the function receives operating function instructions from the computer. The device's operation is affected by the computer instructions.

By using cursor and hand gestures, for example, the user can increase the volume of the radio, by cursor and hand gesturing the increase symbol, or decrease the volume of the radio. The user can cursor and hand gestures at the volume of the radio on the volume indicator, to view the radio's volume. To increase, or decrease the volume, the user cursor and hand gestures the increase, or decrease volume symbols.

The user can use cursor finger following and hand gestures to pick a number the radio station the radio is tuned to, to change the radio station to the number the user desires. The user can use cursor finger following and hand gestures to change the station, by activating the radio station change station increase, or decrease icons, which increases, or decreases the station tuning number. The user can switch between the radio receiving amplitude modulation AM, and frequency modulation FM radio waves, by cursor and hand gestures the change car component symbol, which will change to FM, or AM When the change component icon is cursor and hand gestures, it goes to the next component, and displays the components icon interface. Other components include, climate control heat, and head light brightness. The change icons image changes, to represent the competent is use, such as, a musical note symbol is shown when the radio is on, or a light bulb is shown when the lights are chosen for input.

The user can turn on the head lights by cursor and hand gestures the turn on head lights icon (not shown) with their hand gesture. The user's cursor and hand gestures contact with the light icon, and is detected by the hand gesture screen, which is connected to the computer. The computer activates the turn headlight on function. The computer sends instructions to the headlights switch to turn on the headlights. The light switch is switched to the on position, the lights are turned on.

The user can keep or remove different devices control panels, to lessen the number of control panels viewed, with cursor and hand gestures. The icons can be used for different devices, by changing the components the icons are associated to. The change to another device switch of the input icons is used to switch or toggle between the different components. For example, the icons may be used in the operation of the radio, the user can switch their association to a next component, such as, the operation of a ground positioning system GPS map display, or the air heating system.

The icons can remain continually activated, or can be turned on and off, by the user using their cursor and hand gestures to contact a turn off or turn on off icon (not shown).

Hand Gestures Used to Avoid Bacteria on a Light Switch Description

A light switch is connected to a computer. A hand gesture radar, is connected to a computer, and the computer has hand gesture software. The hand tracker views, and tracks the hand, in mid-air. The hand tracker is positioned to view and detects the user's hands, and fingers gestures, in mid-air, when they present one of their hands at the display, in midair, and within view of the hand trackers. The distance that the fingers are detect is from 0.2 to 4 meters, or farther.

The light switch control panel, has input icons, and is displayed on the display's screen. The icons include, a light off, or lights on icons, and a light dimming slider.

The radar sensor screen detects the user's cursor finger following and hand gestures with their finger, of the off icon. The off icon is inputted, by the detection of the user's cursor finger following and hand gestures with their finger at the off icon. The light is turned off, by the input of the off icon.

The slider is operated by the cursor contacting a sliding icon, and finger gesture to activate the slider icon, which when activated will follow on a scale of from 0 to 10 on the slider scale, the slider icon follows user's finger as it moves. The finger moves the slider icon toward the 10 to increase the brightness of the light, or toward 0 to decrease the brightness. The user finger gestures or moves the cursor, from contact with the slider icon, to disconnect the slider icon from following the finger, when the desired brightness is achieved.

The display may reduce the spread of anti-biotic resistant bacteria, when used to operate devices, such as, light switches, by using cursor finger following and hand gestures on the display's screen. The user doesn't need to touch the control surfaces of the devices, to operate them.

The surfaces may have bacteria, or viruses on them. The bacteria can be transferred to the user's fingers, infecting the user, and possibly causing illness. Hand gesture operation of the switch on the display's screen, limits the bacteria, or viruses on hands, which limits the amount of bacterial transmitted from hands to surfaces, and from hands to other people.

Operation of a Light on Off Switch

The on icon is inputted by the detection of the user's cursor finger following and hand gestures, at the on icon. The light is turned on, by the input of the on icon.

The display receives information that the light has turned on. The display displays that the light, has turned on.

For example, the hand gestures screen detects the user's cursor finger following and hand gestures at the light's, on off switch, on icon. The user moves their hand in midair to move the cursor to the on icon. The on icon is highlighted by contact with the cursor. The user moves one of their fingers and thumb to contact each other, this gesture is interpreted as a left click, activation of the on icon contacted by the cursor.

The interpretation of the hand gesture is done by collecting information of the hand's movement detected by the radar sensor, that is analyzed by radar software in the computer. The collected information is matched to predetermined information associated to hand gestures, to find a match between the information and a library of information associated to different finger gestures. When the finger gesture is determined, an action associated to the determined gesture is activated, like, finger and thumb moving the contact each other activates a left click action. The thumb and finger moving to contact each other is that is described, associated to a mouse left click input.

A Space Station Hand Gestures Display Used to Avoid Static Electricity Description and Operation The space station hand gesture display is connected to a computer. A hand gesture radar, is connected to a computer, and the computer has hand gesture software. The hand tracker views, and tracks the hand, in mid-air. The hand trackers are positioned to view and detects the user's hand's, and fingers gestures, in mid-air, when they present one of their hands at the display, in midair, and within view of the hand trackers. The distance that the fingers are detect is from 0.2 to 4 meters, or farther.

A space control robotic arm panel, has input icons, and is displayed on the display's screen. The control panel to operate a robotic arm on the outside on the station, displayed icons include, up arrow, down arrow, left arrow, right arrow, up right arrow, forward arrow, back arrow, etc.

The radar sensor screen detects the user's cursor finger following and hand gestures with their finger, of the up-arrow icon. The up-arrow icon is inputted, by the detection of the user's cursor finger following and hand gestures, with their finger gesture at the up-arrow icon. The robotic arm is moved up, by the input of the up-arrow icon. The arm continues moving until the cursor is either moved off of the up-arrow, or the fingers are gestured to deactivate the up-arrow, at which point the arm stops its movement.

The display may reduce the static electricity in dry space station environment, by reducing the user's finger contact a physical input control panel, when used to operate devices, such as, unlocking air lock doors, by using cursor finger following and hand gestures on the display's screen. The user doesn't need to touch the control surfaces of the devices, to operate them.

Unlocking Air Lock Doors

Unlocking air lock doors, example, an air lock doors panel, has input icons, that include unlock air lock doors, or lock air lock doors, which are displayed on the display's screen. The unlock air lock doors, radar sensor screen detects the user's cursor finger following and hand gestures with their finger, of the unlock air lock doors icon. The unlock air lock doors, arrow icon is inputted, by the detection of the user's cursor finger following and hand gestures with their finger at the unlock air lock doors icon. The air lock doors are unlocked, by the input of the unlock air lock doors icon. Activation of the lock air lock doors icon, locks the airlock doors.

The air lock doors hand gestures display is connected to a computer. A hand gesture radar, is connected to a computer, and the computer has hand gesture software. The hand tracker views, and tracks the hand, in mid-air. The hand trackers are positioned to view and detects the user's hand's, and fingers gestures, in mid-air, when they present one of their hands at the display, in midair, and within view of the hand trackers. The distance that the fingers are detect is from 0.2 to 4 meters, or farther.

Conclusions, Ramifications and Scope

From the preceding description, and drawings it becomes apparent that the user, may use a hand tracking display to operate a multiuser public device sanitarily.

The hand tracking display, allow a user to input with cursor finger following and hand gestures. The gesture input can be used to direct the operation of a device, such as, a self-driving car, or elevator.

Gesture input, allows for input, without the need to contact a physical surface. Avoiding finger contact with an input surface, decreases the chance of touching bacteria on the surface. Avoiding bacteria increases the ability, to remain bacterially free of bacteria which may cause illness.

Thus, the reader will see that at least one embodiment, of the hand tracking display connected to a device, provides a more reliable, fun, healthier and economical device that can be used by persons of almost any age.

Having now described some embodiments of the, hand tracking display connected to a device, it should be apparent, that the foregoing is merely illustrative and not limiting, having been presented by way of example only. Numerous modifications and other embodiments are within the scope of the embodiments and are contemplated as falling within the scope of the embodiments. The foregoing description and drawings are by way of example only. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

The invention claimed is:

1. Midair hand gestures activating input icons displayed on a display, comprising,
   a display is connected to a computer,
   a hand gesture sensor is connected to the computer,
   the hand gesture sensor is positioned to sense a user's hand in midair,
   the hand gesture sensor detects the user's hand movement in midair,
   the hand gesture sensor detects the user's hand gesture in midair,
   the computer has a hand gesture recognition software that analyses the sensed hand gestures,
   the computer is connected to a plurality of devices,
   the input icons are associated to operations of the devices,
   the input icons describe operations of the devices,
   a cursor is displayed on the display,
   the cursor moves on the display in relation to the users movement of the user's hand in midair,
   the cursor can contact one of the input icons,
   a detection of a hand gesture activates the input icon that the cursor is contacting,
   an activation of one of the input icons is associated to activating an operation of the device that is described by the input icon,
   an activated operation of the device is detected by the computer,
   a detected activated operation of the device is displayed on the display,
   wherein one of the devices is a car, the car is a car that drives itself,
   the described car operation is a start travel operation,
   the car operation is the operation of a start travel operation,
   wherein one of the devices is a radio, the radio is part of the car,
   the described radio operation for a radio operation being a volume increase operation,
   the radio operation being the operation of a volume increase.

2. The input icons of claim 1, wherein the sensor is a hand gesture recognition radar,
   the hand gesture recognition software is a hand gesture recognition radar software.

3. The input icons of claim 1, wherein the hand gesture is the user's thumb and one of the user's fingers moving together to contact each other.

4. The input icons of claim 1, further including the cursor overlaps the contacted operation.

5. The input icons of claim 1,
   further providing the operation that is contacted by the cursor is highlighted.

6. The input icons of claim 1, elevator,
wherein the hand gesture is a movement of the user's finger moving forward.

7. The input icons of claim 1,
wherein the sensor is a hand gesture recognition camera,
the hand gesture recognition software is a hand gesture recognition camera software.

8. A method for midair hand gestures to activate input icons displayed on a display, comprising,
associating the input icons to operations of a device that are different from each other,
associating an activation of one of the input icons to an activation of one of the operation of the device,
describing the operation of the device that the activation of the input icon is associated to activating,
displaying a cursor on the display,
detecting a user's hand movement in midair with a sensor,
moving the cursor in relationship to the detection movement of the user's hand,
contacting one of the input icons with the cursor,
detecting a hand gesture of the user in midair,
activating the input icon contacted by the cursor by the detection of the user's hand gesture,
sending the activated operation of the device to the device,
influencing the operation of the device with the received activated operation,
sending a description of the influenced operation of the device to the display,
wherein one of the devices is a car, the car is a car that drives itself,
the described car operation is a start travel operation,
the car operation is the operation of a start travel operation,
wherein one of the devices is a radio, the radio is part of the car,
the described radio operation for a radio operation being a volume increase operation,
the radio operation being the operation of a volume increase.

9. The method of claim 8, wherein the hand gesture is a movement of the user's finger moving forward.

10. The method of claim 8, wherein the sensor is a hand gesture recognition camera,
the hand gesture recognition software is a hand gesture recognition camera software.

11. The method of claim 8,
wherein the sensor is a hand gesture recognition radar,
the hand gesture recognition software is a hand gesture recognition radar software.

12. The method of claim 8,
wherein the hand gesture is the user's thumb and one of the user's fingers moving together to contact each other.

13. The method of claim 8,
further providing the cursor overlaps the contacted operation.

14. The method of claim 8, further providing the operation that is contacted by the cursor is highlighted.

* * * * *